United States Patent
Brooks et al.

(10) Patent No.: US 11,875,284 B2
(45) Date of Patent: Jan. 16, 2024

(54) ASSET IDENTIFICATION AND TRACKING SYSTEM

(71) Applicant: Transportation IP Holdings, LLC, Norwalk, CT (US)

(72) Inventors: James D. Brooks, Schenectady, NY (US); Guangliang Zhao, Niskayuna, NY (US); Weina Ge, San Ramon, CA (US); Peter Tu, Niskayuna, NY (US); Derek K. Woo, Melbourne, FL (US); Daniel J. Rush, Saint Charles, IL (US); Adam Franco, Melbourne, FL (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 150 days.

(21) Appl. No.: 17/152,631

(22) Filed: Jan. 19, 2021

(65) Prior Publication Data

US 2021/0142268 A1    May 13, 2021

Related U.S. Application Data

(63) Continuation of application No. 16/861,805, filed on Apr. 29, 2020.
(Continued)

(51) Int. Cl.
*G06V 20/00* (2022.01)
*G06Q 10/04* (2023.01)
(Continued)

(52) U.S. Cl.
CPC ............ *G06Q 10/04* (2013.01); *B61L 25/028* (2013.01); *B61L 25/04* (2013.01); *G06F 18/21* (2023.01);
(Continued)

(58) Field of Classification Search
None
See application file for complete search history.

(56) References Cited

U.S. PATENT DOCUMENTS

| 7,328,871 B2 | 2/2008 | Mace et al. |
| 7,492,861 B2 | 2/2009 | Chen et al. |

(Continued)

FOREIGN PATENT DOCUMENTS

| AU | 2019396832 B2 | 7/2021 |
| EP | 1600351 B1 | 1/2007 |

(Continued)

*Primary Examiner* — Vikkram Bali
(74) *Attorney, Agent, or Firm* — The Small Patent Law Group LLC; Philip S. Hof

(57) ABSTRACT

An asset identification and tracking system includes one or more monitoring units configured to monitor at least one designated area. Each of the monitoring units includes an imaging device and one or more processors. The imaging device is configured to generate image data depicting one or more mobile assets that move through the at least one designated area. The one or more processors are operably coupled to the imaging device and configured to analyze the image data to detect and decipher one or more identifiers that are displayed on a particular mobile asset of the one or more mobile assets that move through the at least one designated area. The one or more processors are further configured to generate a detection message that includes the one or more identifiers for communication to an asset control system.

21 Claims, 3 Drawing Sheets

Related U.S. Application Data

(60) Provisional application No. 62/840,891, filed on Apr. 30, 2019.

(51) Int. Cl.

| | | |
|---|---|---|
| *G06Q 10/087* | (2023.01) |
| *G06Q 50/30* | (2012.01) |
| *G06N 3/04* | (2023.01) |
| *G06N 3/08* | (2023.01) |
| *B61L 25/04* | (2006.01) |
| *B61L 25/02* | (2006.01) |
| *G06T 7/20* | (2017.01) |
| *G06F 18/21* | (2023.01) |
| *G06V 30/224* | (2022.01) |
| *G06V 30/14* | (2022.01) |
| *G06V 30/19* | (2022.01) |
| *G06V 20/62* | (2022.01) |
| *G06V 40/20* | (2022.01) |
| *G06V 30/10* | (2022.01) |

(52) U.S. Cl.
CPC ............ *G06N 3/04* (2013.01); *G06N 3/08* (2013.01); *G06Q 10/087* (2013.01); *G06Q 50/30* (2013.01); *G06T 7/20* (2013.01); *G06V 20/00* (2022.01); *G06V 20/62* (2022.01); *G06V 30/1429* (2022.01); *G06V 30/1448* (2022.01); *G06V 30/19173* (2022.01); *G06V 30/2253* (2022.01); *G06V 40/25* (2022.01); *G06T 2207/20081* (2013.01); *G06T 2207/20084* (2013.01); *G06V 30/10* (2022.01); *G06V 2201/07* (2022.01)

(56) References Cited

U.S. PATENT DOCUMENTS

| | | |
|---|---|---|
| 7,746,379 B2 | 6/2010 | Jesson et al. |
| 7,889,931 B2 | 2/2011 | Webb et al. |
| 8,140,250 B2 | 3/2012 | Mian et al. |
| 8,150,105 B2 | 4/2012 | Mian et al. |
| 8,335,606 B2 | 12/2012 | Mian et al. |
| 8,649,932 B2 | 2/2014 | Mian et al. |
| 9,454,816 B2 | 9/2016 | Mian et al. |
| 9,663,127 B2 | 5/2017 | Palmer et al. |
| 9,710,720 B2 | 7/2017 | Mitti et al. |
| 9,846,025 B2 | 12/2017 | Kirchner et al. |
| 9,908,546 B2 | 3/2018 | Palmer et al. |
| 10,007,981 B2 | 6/2018 | Gangitano et al. |
| 10,108,881 B2 | 10/2018 | Xu et al. |
| 10,136,106 B2 | 11/2018 | Shubs, Jr. et al. |
| 10,196,078 B2 | 2/2019 | Shubs, Jr. et al. |
| 10,204,268 B2 | 2/2019 | Xu et al. |
| 10,864,928 B2 | 12/2020 | Shubs, Jr. et al. |
| 10,919,546 B1 | 2/2021 | Llorenty et al. |
| 10,970,851 B2 | 4/2021 | Mian et al. |
| 10,984,521 B2 | 4/2021 | Kohler et al. |
| 10,992,860 B2 | 4/2021 | Liang et al. |
| 2017/0255824 A1 | 9/2017 | Miller et al. |
| 2022/0172335 A1* | 6/2022 | Mian .................. G01N 21/8806 |

FOREIGN PATENT DOCUMENTS

| | | |
|---|---|---|
| EP | 2093561 B1 | 2/2016 |
| WO | WO-2018037355 A1 * | 3/2018 |

\* cited by examiner

ASSET IDENTIFICATION AND TRACKING SYSTEM

CROSS-REFERENCE TO RELATED APPLICATIONS

This application is a continuation of U.S. application Ser. No. 16/861,805, which was filed on 29 Apr. 2020 (the "'805 Application"). The '805 Application claims priority to U.S. Provisional Application No. 62/840,891, which was filed on 30 Apr. 2019, and the entire disclosures of both applications are incorporated herein by reference.

BACKGROUND

Technical Field

The inventive subject matter described herein relates to a system for identifying and tracking mobile assets.

Discussion of Art

Inventory management may rely on manual processes performed by operators and observers. Some of the assets may be mobile, and some of those may be self-propelled. An example of a self-propelled asset vehicle is a locomotive, which may arrive in a locomotive yard as part of a train. The train may be disassembled into its component cars and locomotives, and then reassembled in a new configuration. Yard crews may be used to monitor the sequence of receiving and identifying a train, breaking down the train, and rebuilding one or more new trains. A yard crew may be used to walk along an arriving train to log an assigned identifier for each of the cars in the train to inventory. After a train is built and ready to leave the yard, another yard crew may be tasked with checking and logging the assigned identifiers of all the cars in this train to validate that the correct cars are included in the train. Considering that trains may have hundreds of cars and stretch for hundreds of yards, manual identification of the cars in the trains that enter and leave the yard can be a tedious, time consuming, and error-prone process.

One alternative to the fully manual identification process is to install electromagnetic sensor systems at the entrances and exits of the yard. Such sensor systems may involve installing special sensors or tags, such as RFID tags or the like, on each of the rail cars and installing reader devices at the entrances and exits. These sensor systems can be costly both in terms of hardware costs and setup costs because all cars that enter the yard must have a tag in order to be detected by a reader and logged into the inventory system. Furthermore, the tags that are coupled to cars have an inherent risk of falling off the cars during operation, malfunctioning, breaking, or the like, which would prevent the readers from identifying those cars. The use of electromagnetic sensors or tags installed on the cars can be costly and require significant effort to maintain the proper functionality. Further, improper train builds may not be noticed until the train leaves the station, which may necessitate a trip delay.

It may be desirable to automate the inventory management process to improve operation efficiency and reduce work force demand, while avoiding the costs associated with electromagnetic sensors installed on the vehicles.

BRIEF DESCRIPTION

In one or more embodiments, a system (e.g., an asset identification and tracking system) is provided that includes one or more monitoring units and one or more processors. The one or more monitoring units are configured to monitor at least one designated area. Each of the monitoring units includes an imaging device configured to generate image data depicting one or more mobile assets that move through the at least one designated area. The one or more processors are operably coupled to the monitoring units and configured to analyze the image data to detect one or more non-alphanumeric graphic identifiers that are displayed on a particular mobile asset of the one or more mobile assets that move through the at least one designated area. The one or more processors further are configured to decipher or assign the one or more non-alphanumeric graphic identifiers to the particular mobile asset.

In one or more embodiments, a method (e.g., for identifying and tracking assets) is provided that includes monitoring at least one designated area by generating image data depicting one or more mobile assets that move through the at least one designated area. The method includes analyzing the image data to detect one or more non-alphanumeric graphic identifiers that are displayed on a particular mobile asset of the one or more mobile assets that move through the at least one designated area. The method also includes assigning the one or more non-alphanumeric graphic identifiers to the particular mobile asset.

In one or more embodiments, a system (e.g., an asset identification and tracking system) is provided that includes multiple monitoring units and an asset control system. The monitoring units are configured to monitor different designated areas. Each of the monitoring units includes and one or more processors. The imaging device is configured to generate image data depicting one or more mobile assets that move through the designated area. The one or more processors are configured to analyze the image data to detect one or more non-alphanumeric graphic identifiers that are displayed on a particular mobile asset of the one or more mobile assets that move through the designated area. The one or more processors further are configured to assign the one or more non-alphanumeric graphic identifiers to the particular mobile asset and generate a detection message for communication that includes the one or more non-alphanumeric graphic identifiers assigned to the particular mobile asset. The asset control system is configured to receive the detection message and update an inventory database to associate the particular mobile asset with both the one or more non-alphanumeric graphic identifiers and the designated area that is monitored by the monitoring unit that generated the detection message.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
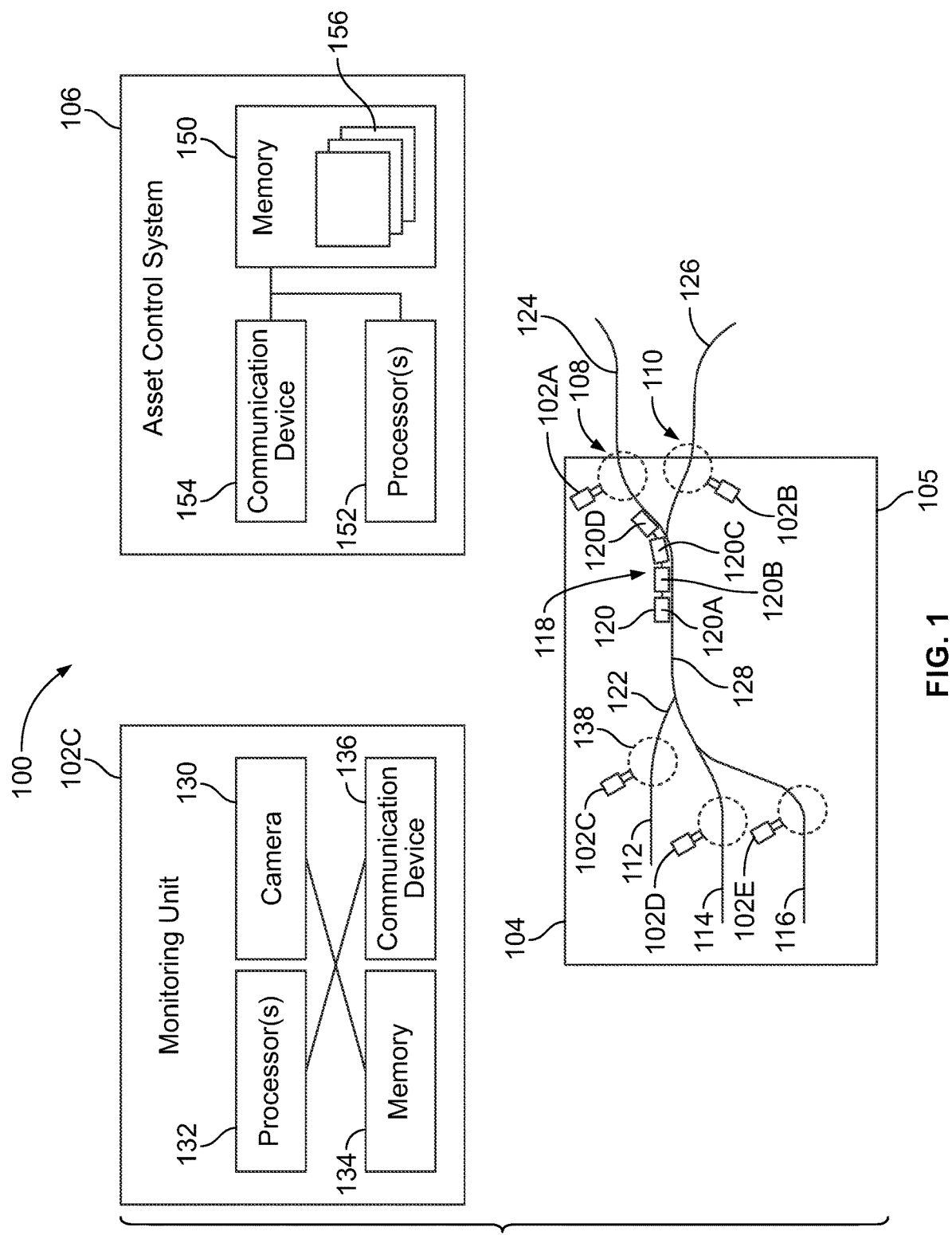
FIG. 1 a schematic diagram of a mobile asset system according to an embodiment of the disclosure.

One or more embodiments described herein provide an asset identification and tracking system for identifying and tracking moving objects, such as mobile assets, using computer vision and machine learning. In various embodiments, the system utilizes video analytics to detect objects moving through designated areas, classify the types of the detected moving objects, and detect and decipher identifiers on the detected moving object for identifying the locations of the particular detected objects and tracking the movement of the particular detected objects over time. The identifiers can include alphanumeric character strings and non-alphanumeric graphic features. The asset identification and tracking system is also referred to herein as a mobile asset system. The objects and/or mobile assets can include vehicles, mobile equipment, or persons.

The asset identification and tracking system includes one or more monitoring units installed at one or more designated areas. For example, the system can have multiple monitoring units that monitor different designated areas. In one embodiment, the designated areas are within a common zone or enclosure. The enclosure may have entrances, exits, maintenance areas, and different route segments within. Various vehicles may enter the enclosure, park in the enclosure for periods of time, and then exit the enclosure. Suitable monitoring units may include imaging devices, such as cameras that can obtain images in various ranges of the spectrum, such as the visible region, the infra-red region, and the ultraviolet region. The imaging device may generate image data that depicts a respective field of view of each imaging device. For example, the cameras located at the entrances capture the vehicles arriving at the enclosure, and the cameras located at the exits capture the vehicles leaving the enclosure. The asset identification and tracking system may also include an asset control system that communicates with the one or more monitoring units. Based on information received from the monitoring units, the asset control system can store and update the detected locations of multiple mobile assets in the enclosure to provide an overall snapshot of the mobile assets in the enclosure at any given time.

Using computer vision (e.g., image analysis), machine learning algorithms, and/or artificial intelligence (AI) technologies, the tracking system can analyze the image data to detect individual assets and decipher uniquely-assigned alphanumeric identifiers that are displayed on the assets. Each assigned identifier may be a character string of one or more letters and/or numbers that is associated with only one particular asset, such as a serial number or license plate. The assigned identifiers may be painted or otherwise applied on exterior surfaces of the assets. For example, the assigned identifiers may be Federal Railroad Association identifiers (FRA ID) that are mandated by regulation to be displayed on all four sides along a perimeter of a rail car. The asset identification and tracking system is configured to automatically "read" (e.g., detect and decipher/recognize the content of) the assigned identifier on each of the assets moving within the field of view of each of the cameras. The detection results may be compiled into a list of assigned identifiers. And, the order in which the assigned identifiers are determined enables the system to determine an order of the assets passing through the field of view.

In one embodiment, a detected mobile asset may not have an assigned alphanumeric identifier, the assigned identifier may be obstructed (and therefore not within the direct view of an imaging device), or the assigned identifier may be oriented away from the camera. For whatever reason, it may be desirable to track a particular mobile asset from one designated area to another without being able to read the assigned identifier. One or more graphic identifiers may be used to differentiate one mobile asset from another, to identify a particular mobile asset, and/or to track that particular mobile asset. Graphic identifiers refer to distinguishing features and/or indicia on the assets depicted in the image data. Suitable graphic identifiers may include symbols, logos, decals, placards, colors, asset types, asset shapes, asset sizes, cargo, accessories, damage (e.g., dents, scratches, etc., discoloration, rust, graffiti, dirt, precipitation (e.g., snow, rain, etc.), occupancy details, and the like. Individually, each graphic identifier may be specific to a subset of multiple mobile assets. For example, the shape of a hopper rail car is specific to other hopper rail cars but distinguishes from flatbed cars, locomotives, tanker cars, and the like. The occupancy may refer to features of a person or persons onboard the mobile asset, such as whether or not the asset has a driver and, if so, the driver's appearance.

When combined, multiple graphic identifiers can be used to positively identify a particular asset relative to all other assets, at least within a confidence level, without knowing the assigned identifier or any other source of identification. For example, if the system knows that a particular mobile asset is a specific type of asset and has a dent in a certain location, and a monitoring unit detects a mobile asset of the same type with a dent in that known location, the system can assign a predicted identity to that mobile asset. Naturally, a single dent (in this example) would not likely be enough for a perfect identification. However, by matching additional graphic identifiers, such as the location, the time, a logo on mobile asset, a specific type of cargo or accessory present on asset, and the like, the probability that the identification is correct increases. Further, as more graphic identifiers are noticed by the monitoring unit, the probability can increase. Other graphic identifiers may include, in addition to the dent, a rust spot or a pattern of rust spots, scratches, discoloring, paint schemes, wear indicators, and the like. For short term, mud splatters or snow cover (especially on a roof from an aerial view) may be useful.

Although some graphic identifiers are non-alphanumeric, at least some graphic identifiers can include letters and/or numbers. For example, some character strings on assets may identify a subset of assets, such that the character string represents a type of asset, a business entity that operates the asset, or the like. Although detection and recognition of these character strings does not positively identify a single particular asset relative to all other assets (unlike an assigned identifier), such character strings may be characterized as graphic identifiers that can be used for differentiating the assets with the character strings from assets that do not have the same character strings.

In one embodiment, the mobile asset may be identified by one monitoring unit, associated with a particular designated area, and then tracked from designated area to designated area using the monitoring units to detect the one or more assigned identifiers and/or graphic identifiers. This may be enhanced by using other identification methods when such are available. For example, if an assigned identifier or a personal identifier is available then the inventive system may re-confirm the graphic identifier(s) with the particular mobile asset at that time.

The detection results from each of the monitoring units that monitor different designated areas may be communicated to the asset control system. By combining the detection results with the known locations of the monitoring units that generated the detection results, the asset control system can determine a location of each of multiple particular mobile assets. For example, the asset control system can determine whether a specific vehicle is arriving at the enclosure, located at a maintenance area in the enclosure, located along a particular route segment, or leaving the enclosure. Furthermore, the asset control system may be updated in real time or near real time based on received information from the monitoring units. For example, if a particular mobile asset was previously detected by the monitoring unit disposed at the entrance, but has since been detected by a monitoring unit disposed along a parking area, then the asset control system updates a stored or logged location of the particular mobile asset in a memory (e.g., inventory database) to indicate that the asset is located at the parking area, no longer at the entrance. Updating the locations of the assets enables continuous tracking of the assets over time. In one embodiment, the system may provide full and autonomous visibility of mobile assets within a defined area, automating the processes of mobile asset verification and inventory updating.

A technical effect of one or more embodiments of the asset identification and tracking system described herein may include improving mobile asset movement efficiency within an enclosure using computer vision algorithms for automated mobile asset identifications and inventory updates. The efficiency may be enhanced by simplifying the mobile asset system build process and inventory management procedure, instead of utilizing a fully manual process performed by human operators or costly electromagnetic sensing systems, such as installing RFID tags and readers. Another technical effect may include enhanced tracking of individual mobile assets by detecting mobile assets at a multitude of locations instead of only at entrances and/or exits. The information received from the monitoring units can be utilized to track the movements of a specific mobile asset. Such knowledge of mobile asset location within an enclosure can indicate, among other things, how close/soon a mobile asset is to exiting the enclosure. This may be useful information for a person tracking a good that is, or is being shipped within, that mobile asset.

FIG. 1 a schematic diagram of an asset identification and tracking system 100 (e.g., mobile asset system) according to an embodiment of the disclosure. The system 100 includes a plurality of monitoring units 102 installed at different locations within a zone or enclosure 104. The zone is defined by a boundary 105, which may represent a physical border, such as a fence, or an intangible border, such as a property line. The system 100 may include an asset control system 106 that is operably connected to the monitoring units. The monitoring units may be associated with different designated areas within the zone. The designated areas can be defined by functional boundaries, such as camera fields of view. The monitoring units may detect and identify the mobile assets that travel within or through the respective designated areas. The monitoring units can identify the mobile assets by analyzing image data to visually detect and decipher the assigned identifiers and graphic identifiers displayed on sides of the assets.

In the illustrated embodiment, a first monitoring unit 102A is located at an entrance 108 of the zone, a second monitoring unit 102B is located at an exit 110 of the zone, a third monitoring unit 102C is located at a first parking area 112, a fourth monitoring unit 102D is located at a second parking area 114, and a fifth monitoring unit 102E is located at a maintenance area 116. The first and second parking areas may represent different locations where individual mobile assets, which in this example are vehicles, can be assembled together to define a vehicle system for traveling together along a route to a destination. The maintenance area may represent a location of a service shop or garage for repairing and/or servicing vehicles. If a mobile asset visits a service shop or garage, then a graphic identifier association may be reset or the confidence level may be lowered. In one embodiment, the repair services are checked and if a dent is fixed then the graphic identification that relies on the dent's presence is updated accordingly.

The zone may include one or more routes 122 on which mobile assets 118 can travel. The routes include an entrance route 124 and an exit route 126 that meet at main route 128. The main route 128 branches into three different route segments within an enclosure in the illustrated embodiment. A first route segment represents the first parking area 112, a second route segment represents the second parking area 114, and a third route segment represents the maintenance area 116. FIG. 1 shows one vehicle system 118 within a vehicle enclosure which represents the zone. The vehicle system is formed from multiple individual vehicles 120. Optionally, upon entering the enclosure, the vehicles 120 of the vehicle system 118 are uncoupled and moved to different areas of the enclosure. For example, a first vehicle 120A of the vehicle system may be moved to the first parking area for assembly in a second vehicle system scheduled to leave the enclosure at a designated time to travel to a designated location. A second vehicle 120B of the vehicle system may be moved to the second parking area for assembly in a third vehicle system scheduled to leave the enclosure at a different time than the second vehicle system and/or scheduled to travel to a different destination than the second vehicle system. A third vehicle 120C of the vehicle system may be moved to the maintenance area to receive scheduled or unscheduled maintenance. A fourth vehicle 120D of the vehicle system may be moved to the first parking area and coupled to the first vehicle within the second vehicle system.

The vehicle system in the illustrated embodiment represents a vehicle platoon, swarm, and consist (collectively "consist"). Suitable vehicle consists may include a rail vehicle consist (e.g., train) having both propulsion-generating vehicles and non-propulsion-generating vehicles mechanically coupled together by couplers (and may optionally be electrically connected together). In this example, the propulsion-generating vehicles may be locomotives, and the non-propulsion-generating vehicles may be rail cars. The routes may be railroad tracks.

Although various embodiments shown and described herein are directed to rail-based vehicles, the mobile asset system can be used for tracking other types of mobile assets instead of, or in addition to, rail vehicles. Other suitable assets may include highway vehicles (e.g., automobiles, trucks, or other vehicles designed and/or permitted for travel on public roadways), off-highway vehicles (e.g., mining vehicles or other vehicles that may not be designed or permitted for travel on public roadways), marine vessels, aerial drones, or the like. For example, the vehicle consist may include a group of communicatively linked on-road vehicles, and the route may be a road. In one embodiment, the vehicles are remote-controlled or autonomous. The vehicle system may be formed from several vehicles that may be physically separate from each other but logically coupled with each other to enable communication among the vehicles to coordinate their movements. Additionally, a suitable vehicle system may be formed from a single vehicle that is propulsion-generating, instead of from multiple vehicles.

Suitable propulsion-generating vehicles may include respective propulsion systems that generate tractive effort for propelling the vehicle system along the route. Each propulsion system may have one or more traction motors operably coupled with different axles and/or wheels of the vehicles. The traction motors may be connected with the axles and/or wheels via one or more gears, gear sets, or other mechanical devices to transform rotary motion generated by the traction motors into rotation of the axles and/or wheels. Different traction motors may be operably connected with different axles and/or wheels such that traction motors that may be deactivated (e.g., turned OFF) do not rotate corresponding axles and/or wheels while traction motors that remain activated (e.g., turned ON) rotate corresponding axles and/or wheels. Each propulsion system may also include an energy storage system that provides electrical power to the traction motors. For example, the traction motors in a propulsion state may be powered by electric current provided to the traction motors by the energy storage system. In a regenerative braking state, the traction motors may supply electric current generated based on the rotation of the wheels and/or axles to the energy storage system for charging energy storage devices (e.g., battery cells or the like) thereof.

The monitoring units may generate image data that captures mobile assets moving through the designated areas associated with the monitoring units. The components of one monitoring unit (e.g., unit 102C) are shown in schematic block form in FIG. 1. The monitoring unit may include an imaging device 130 (referred to herein as camera), one or more processors 132, a tangible and non-transitory computer-readable storage medium (e.g., memory) 134, and a communication device 136. The monitoring unit may include additional components or different components than the components illustrated in FIG. 1. At least some of the other monitoring units can have the same types of components as the illustrated monitoring unit.

The camera is configured to generate image data within a respective field of view 138 of the camera. The camera field of view may represent or define the designated area assigned to the monitoring unit. For example, as one or more vehicles travel through the field of view 138 towards the first parking area, the camera of the monitoring unit generates image data to capture the one or more mobile assets traveling through the field of view. The image data may represent video at a designated frame per second rate. Optionally, the image data may represent still images generated at a designated frequency, such as one image every second, every two seconds, every half second, or the like. The frame rate of the video or the frequency of the still images may be based on application-specific parameters, hardware capability, and/or a permitted speed along the route in the area. For example, a camera may acquire video at a greater frame rate for a route segment with a greater upper speed limit than for a route segment with a lower speed limit to ensure that each mobile asset is captured in at least one frame of the image data. The image data can then be analyzed to identify all of the mobile assets that travel through the area of the route.

The one or more processors of each monitoring unit control the functionality of the monitoring unit. The one or more processors represent hardware circuitry (e.g., one or more microprocessors, integrated circuits, microcontrollers, field programmable gate arrays, etc.) that performs operations based on one or more sets of programmed instructions (e.g., software). The programmed instructions on which the processors operate may be stored on the local memory. The memory may include one or more computer hard drives, flash drives, RAM, ROM, EEPROM, and the like. Alternatively, instructions that direct operations of the processors may be hard-wired into the logic of the control circuitry, such as by being hard-wired logic formed in programmable gate arrays (fpga), complex programmable logic devices (cpld), and/or other hardware. The processors are operably connected to the memory and/or the camera. The memory can be operably coupled to the camera, either directly or through the processors. For example, the memory may receive the image data generated by the camera, and the one or more processors may access the image data within the memory. The one or more processors may be conductively connected to the memory and the camera via electrical wires, contactors, optical cables, circuit traces, or the like.

The communication device can represent circuitry that can communicate electrical signals wirelessly and/or via wired connections. For example, the communication device can represent transceiving circuitry, one or more antennas, modems, or the like. The transceiving circuitry may include a transceiver or separate transmitter and receiver devices. The electrical signals can form data packets that in the aggregate represent messages. In various embodiments, the one or more processors of the monitoring unit can generate messages, such as detection messages, that are communicated remotely by the communication device. The communication device can also receive messages and forward the messages to the one or more processors of the monitoring unit for analysis of the received messages.

In an embodiment, the communication device is controlled by the one or more processors to transmit detection messages to the asset control system. The detection messages may be generated by the one or more processors. The detection messages may include information determined by analyzing the image data, such as a list of various identifiers (e.g., alphanumeric and/or non-alphanumeric) deciphered from the image data, still images and/or frames generated by the camera, a time stamp at which the images were generated, a number of mobile assets detected, an order or sequence of the mobile assets detected, an identity and/or location of the monitoring unit that generated the image data, and/or the like. For example, the mobile asset identifiers in the list may be compiled in the order in which the mobile asset identifiers are detected, which corresponds to the order of the mobile assets traveling through the field of view of the camera. The first mobile asset identifier in the list may correspond to the first mobile asset of a mobile asset system that traveled through the field of view, and the second mobile asset identifier in the list corresponds to the mobile asset adjacent to the first mobile asset.

The asset control system may include a tangible and non-transitory computer-readable storage medium (e.g., memory) 150, one or more processors 152, and a communication device 154. The one or more processors control the functionality of the asset control system. The one or more processors represent hardware circuitry (e.g., one or more microprocessors, integrated circuits, microcontrollers, field programmable gate arrays, etc.) that performs operations based on one or more sets of programmed instructions (e.g., software). The programmed instructions on which the processors operate may be stored on the memory of the asset control system. In an embodiment, the memory stores an inventory database 156. The one or more processors of the asset control system may access the inventory database to retrieve and/or update the information stored therein. The updating can include replacing outdated information with information received from the monitoring units that is more accurate, current, and/or up-to-date. The inventory database may store the locations of the monitoring units, the designated areas of the enclosure monitored by the monitoring units, and the identities of the monitoring units. The inventory database also stores entries for the mobile assets that are detected by the monitoring units. A given entry for a detected mobile asset can include various information, such as the identity of the monitoring unit that detected the mobile asset, a timestamp at which the mobile asset is detected, the designated location of the monitoring unit that detected the mobile asset, an assigned identifier of the mobile asset (if deciphered), one or more graphic identifiers of the mobile asset detected from the image data, actual image data of the mobile asset generated by that monitoring unit, and/or the like. The information in the database entry may be categorized based at least on the assigned identifier associated with the particular mobile asset.

For example, the first time that a particular mobile asset is detected would presumably be upon arriving at the entrance 108. After the monitoring unit at the entrance detects the mobile asset and deciphers an assigned identifier associated with that mobile asset, such as "ABC123" for example, then the communication device of the monitoring unit communicates the detection message to the asset control system. The detection message contains the identifier (ABC123). The system may additionally or alternatively detect and decipher one or more non-alphanumeric graphic identifiers associated with the mobile asset.

The detection message may include information related to multiple different mobile assets detected by the same monitoring unit, such as in the case when an asset system of multiple assets (e.g., a train of multiple rail vehicles) travels through the designated area. The detection message may have a list that contains the information associated with each of the particular mobile assets. For example, the list has information associated with a first mobile asset that is detected, information associated with a second mobile asset that is detected immediately after the first mobile asset, and so on. The information associated with each mobile asset can include a time stamp at which that particular mobile asset is detected and any detected and deciphered identifiers, such as the assigned alphanumeric identifier and one or more graphic identifiers. The graphic identifiers can be detected by analyzing the image data using a trained neural network or the like. Optionally, at least some of the image data depicting the particular mobile asset or adjacent mobile assets may also be included in the detection message, especially for assets with unread assigned identifiers. The detection message may provide a time stamp and identify the source of the message as the monitoring unit located at the entrance (e.g., 102A in FIG. 1). The arranged list and/or the time stamps indicate the order of the mobile assets. The inventive system may associate the graphic identifiers with the particular mobile asset, and may assign a weighting, rating or probability level based at least in part on the graphic identifiers, and other factors, such as time and type. If an assigned identifier, a personal identifier, or the like is detected, then the association may be accorded a higher probability if, in the future, a mobile asset is noted by a monitoring system that has a matching set of graphic identifiers.

The asset control system receives the detection message via the communication device at the asset control system. The communication device at the asset control system can represent circuitry that can communicate electrical signals wirelessly and/or via wired connections. For example, the communication device can represent transceiving circuitry, one or more antennas, modems, or the like. The transceiving circuitry may include a transceiver or separate transmitter and receiver devices. The electrical signals can form data packets that in the aggregate represent messages. The communication device can receive messages, such as the detection messages, and forward the messages to the one or more processors at the asset control system for analysis of the received messages. The one or more processors analyze the detection message and update the inventory database with the information contained in the message. For example, the processors may create a new entry for the mobile asset identifier ABC123 and indicate in the database that the mobile asset associated with ABC123 is located at the entrance at the detected time. Alternatively, if the mobile asset has been previously detected and entered into the inventory database, the processors may update a previous entry or folder in the database to reflect that the most recent location of the mobile asset is the entrance. The processors may also store one or more graphic identifiers of the particular asset (e.g., dents, graffiti, logos, paint color, etc.) in the database to establish an association between the graphical identifiers and the particular mobile asset and any information about that asset. When the assigned identifier is readable, such that is known that the detected asset in the image data is ABC123, the graphic identifiers are associated with the assigned identifier in the database to support future identifications of the particular mobile asset even if the assigned identifier is indecipherable.

In operation, the monitoring units of the mobile asset system are configured to detect and identify the mobile assets that travel through the fields of view of the respective cameras and communicate the detected mobile asset identifiers to the asset control system. For example, the monitoring unit 102A can identify the mobile assets that enter the zone at the entrance, the monitoring unit 102B can identify the mobile assets that leave the zone at the exit, the monitoring unit 102C can identify the mobile assets that enter the first parking area, the monitoring unit 102D can identify the mobile assets that enter the second parking area, and the monitoring unit 102E can identify the mobile assets that enter the maintenance area. The asset control system updates the inventory database in response to receiving detection messages from the monitoring units that indicate updated mobile asset locations. For example, if a particular mobile asset that was previously identified at the entrance by the monitoring unit 102A is subsequently identified at the second parking area by the monitoring unit 102D, then, upon receiving a detection message from the monitoring unit 102D, the processors update the location information in the inventory database for that mobile asset to indicate that the mobile asset is located at the second parking area instead of the entrance at a particular time that the location information is updated. Therefore, based on the information received from the monitoring units, the asset control system is able to track and catalog the movements and/or locations of the mobile assets over time.

Optionally, at least one monitoring unit may be disposed at an elevated position relative to other monitoring units. Such a monitoring unit is referred to herein as an overseer monitoring unit. The overseer monitoring unit may be affixed to a tall structure, such as a pole, radio tower, tall building, or the like, or may be affixed to an unmanned aerial device that flies over the zone. The overseer monitoring unit has a larger designated survey area than the designated areas monitored by the other monitoring units disposed closer to the ground. The survey area of the overseer may overlap one or more of the designated areas monitoring by other monitoring units. In an embodiment, the image data generated by the overseer monitoring unit may be analyzed and compared with the image data generated by the other monitoring units, disposed more proximate to the ground. The bird's eye view provided by the overseer monitoring unit can enhance the asset detection and tracking capabilities of the system.

In addition to tracking individual mobile assets, the mobile asset system may automatically generate and/or validate an asset manifest as a mobile asset system is assembled in the mobile asset zone. For example, as a new mobile asset system is assembled at the first parking area 112, the monitoring unit 102C can automatically identify the mobile assets that are moved to the route segment at the first parking area for assembly into the new mobile asset system as the mobile assets travel through the field of view of the camera. Based on the detected mobile assets and the order at which the mobile assets are detected, the monitoring unit and/or the asset control system can generate an asset manifest that lists the mobile assets identified by the monitoring unit 102C in order. The generated asset manifest can be compared with a planned trip manifest stored in a memory device, such as the memory device 134 of the monitoring unit 102C, or the memory device 150 of the asset control system. If the generated asset manifest matches the planned trip manifest, then the assembled mobile asset system is validated, indicating that the correct mobile assets are included in the mobile asset system in the correct order. If the generated mobile asset manifest does not match the planned trip manifest, such as in the specific mobile assets or the order of the mobile assets, an alert message may be generated to notify an operator of this discrepancy. The alert message may be generated by the asset control system and/or the relevant monitoring unit. By automatically generating and validating manifests as a mobile asset system is assembled, temporarily parked, and/or moved within an enclosure, the mobile asset system can reduce or obviate the need of operators to manually check each of the mobile assets in a mobile asset system prior to embarking on a trip.

In an embodiment, the asset control system communicatively connected to the monitoring units via wireless communication links. For example, the asset control system may be located at the zone or enclosure and connected to the monitoring units via RF signals. Optionally, the asset control system may be farther away from the zone and connected to the monitoring units via the Internet, satellites, and/or the like. In an alternative embodiment, the asset control system may be communicatively connected to at least some of the monitoring units via electrical or optical wires.

In one embodiment, to efficiently and quickly detect and identify the mobile assets that travel through the designated area, the monitoring units may perform image analysis and processing of the image data generated by the respective cameras. In an embodiment, the image analysis and processing may be performed by the one or more processors in a coupled edge device. The processors may apply deep learning and computer vision technology in a mobile asset identification algorithm designed to decipher the identifiers on the sides of the mobile assets. By performing the mobile asset identification algorithm at the nodes represented by the individual monitoring units, the systems that communicate with the monitoring units, such as the asset control system, can receive completed detection results without having to perform additional image analysis. The mobile asset identification algorithm according to an embodiment is described below with respect to rail mobile assets (e.g., trains), but the mobile asset identification algorithm may be utilized with suitable other types of mobile assets. Suitable other mobile assets may include a convoy of road-based trucks or off-road trucks, mining equipment, fleets of ships, individuals or groups of people, and the like.

In order to detect and decipher the assigned and graphic identifiers of a moving train, the mobile asset identification algorithm may have multiple video analysis components or subroutines, including mobile asset detection, mobile asset association between multiple image frames (e.g., tracking), identifier detection, and identifier recognition. The mobile asset detection subroutine can detect all mobile assets in the image data generated by the respective camera of the monitoring unit and can generate bounding boxes that surround the mobile assets in the image data. The mobile asset association subroutine may represent a multi-object tracking algorithm to track each individual car throughout the frames of video that depict the same car to understand the sequence of cars and identify the start-to-end frames. For example, a group of multiple interconnected mobile assets can be tracked in multiple image frames generated over time by a single camera. The mobile asset association subroutine may also designate key frames for each of the detected cars. Each key frame is a single frame selected from a sequence of multiple image frames of the image data that depict a common mobile asset (e.g., the same rail car).

The identifier detection subroutine may be applied to each of the key frames without being applied to the image frames in the sequences that are not the key frames. Therefore, the identifier detection subroutine can be performed only once for each mobile asset to limit excessive computation and processing. To further limit excessive computation and processing, the identifier detection subroutine may perform image analysis on only a subsection of the image data in each key frame. The subsection may represent the area within the bounding box that surrounds the mobile asset because the identifier is only located within the bounding box. The areas outside of the bounding box in each key frame can be ignored and/or deleted. The identifier detection subroutine may utilize a character detection model to detect any character string inside the bounding box of the car. The character string may include letters and numbers, and optionally may also include symbols. Upon detecting a character string, the image data within a bounding box surrounding the character string may be analyzed according to the identifier content recognition subroutine.

The identifier recognition subroutine may perform character content recognition for each detected character string for the purpose of deciphering an assigned alphanumeric identifier of the asset. The identifier recognition subroutine may output a determined character string as interpreted by the subroutine. The one or more processors may store the determined character strings in the local memory of the monitoring unit as assigned identifiers, and/or may communicate a list of the determined character strings (e.g., assigned identifiers) to the asset control system. The subroutine may also recognize and catalog various parameters associated with the assigned identifier in the database. For example, the color, skew (or angle), size dimension, reflectivity, brightness, and the like of the character string may be recognized and stored. Optionally, the processors may compare the assigned identifiers that are deciphered to unique identifiers stored locally in the memory in a database.

The identifier recognition subroutine may perform separate content recognition on the image data for interpreting graphic identifiers on the asset. For example, the subroutine may catalog and recognize various parameters associated with a graphic identifier, such as the color, the reflectivity, the angle, and the like. The one or more processors may store the determined graphic identifiers in the local memory of the monitoring unit and/or may communicate a list of the graphic identifiers, which differentiate the appearance of one mobile asset from another, to the asset control system. The identifier recognition subroutine may generate a confidence level that indicates a confidence of the processors that the determined matches are for the actual mobile asset associated with the identifiers. If the confidence level is below a certain threshold, the one or more processors may take responsive actions, as described below. In an alternative embodiment, different subroutines decipher the character strings of assigned identifiers and decipher the graphic identifiers.

Asset Detection

Figure 2:
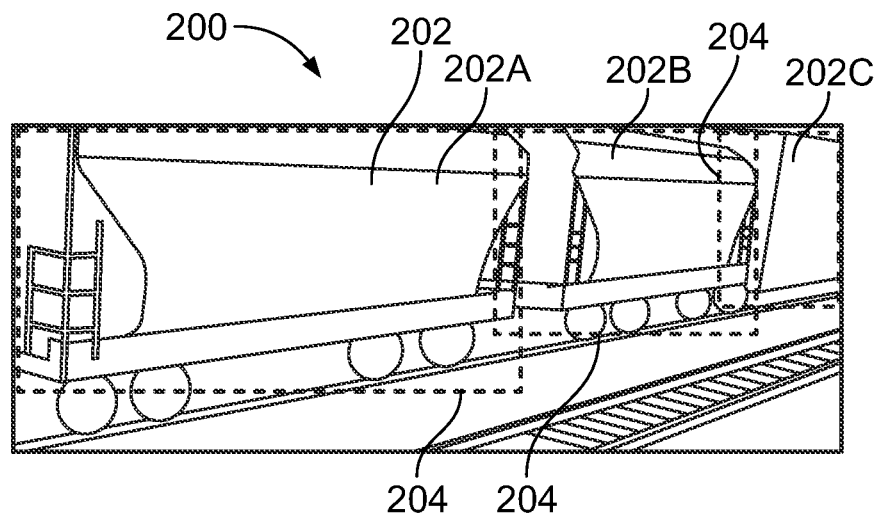
FIG. 2 is an image depicting multiple train cars surrounded by respective bounding boxes that are superimposed on the image according to an embodiment.

FIG. 2 is an image 200 depicting multiple train cars 202 surrounded by respective bounding boxes 204 that are superimposed on the image 200 according to an embodiment. The image 200 may be generated by the camera of one of the monitoring units. Optionally, the monitoring units may include a proximity sensor and/or a movement detection sensor. The proximity sensor and/or movement sensor may be operably connected to a switch that activates and/or deactivates the camera. For example, a leading car of a train may be detected by the sensors, which activates the camera to begin generating image data within the field of view of the camera. In an alternative embodiment, the camera may continuously generate image data, at least during designated active time periods, and the processors may store the image data in the memory in a loop according to a first in, first out basis.

The asset detection subroutine of the identification algorithm may be applied to the image 200 to generate the bounding boxes 204. The asset detection subroutine may provide the locations of each rail car in every image of the image data, such as every frame of a video stream. As described above, determining the locations of the cars within the images can limit the search areas for the assigned and graphic identifiers because such identifiers are only located on the cars, thereby reducing the amount of image data to analyze and process relative to analyzing and processing all of the image data in the image 200.

Figure 6:
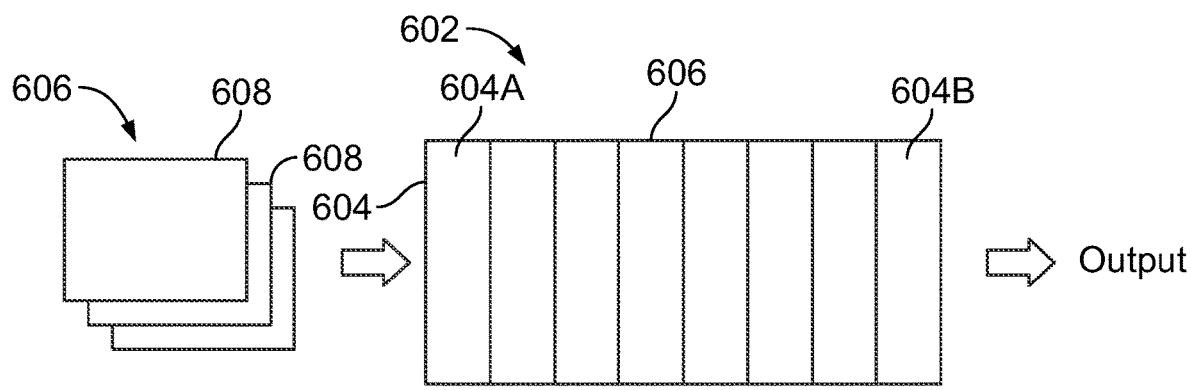
FIG. 6 illustrates a set of images poised for examination using an artificial neural network that represents a portion of an identifier detection algorithm according to an embodiment.

In an embodiment, the asset detection subroutine may be performed by a convolutional neural network deep learning model for object detection, such as the neural network 602 described in FIG. 6. The neural network may be trained to learn and identify various types of assets, such as vehicles, persons, and other mobile equipment. The neural network can be trained to learn and identify different types of rail vehicles, such as gondolas, box cars, hoppers, coal cars, center beam cars, flat bed cars, tanker cars, and the like. The neural network may be deployed to the mobile asset system to detect cars in real time. The neural network may be stored on the local memories of the monitoring units. When a train passes within the field of view of the camera of a monitoring unit, the video frames generated by the camera may be analyzed by the neural network to detect the cars in each image frame. The neural network may output bounding boxes to surround each of the detected cars in the image frames. Each detected car will be represented by a 4-points bounding box (x, y, w, h), i.e., a two-dimensional top left point coordinate (x, y), and box width and height, to indicate the car location in the frame. The size of the bounding box represents the detected size of the car in the image frame. In FIG. 2, the left-most train car 202A is the closest to the camera and has the largest bounding box compared to the sizes of the bounding boxes of the center train car 202B and right-most train car 202C in the image.

Asset Tracking Between Images

Figure 3:
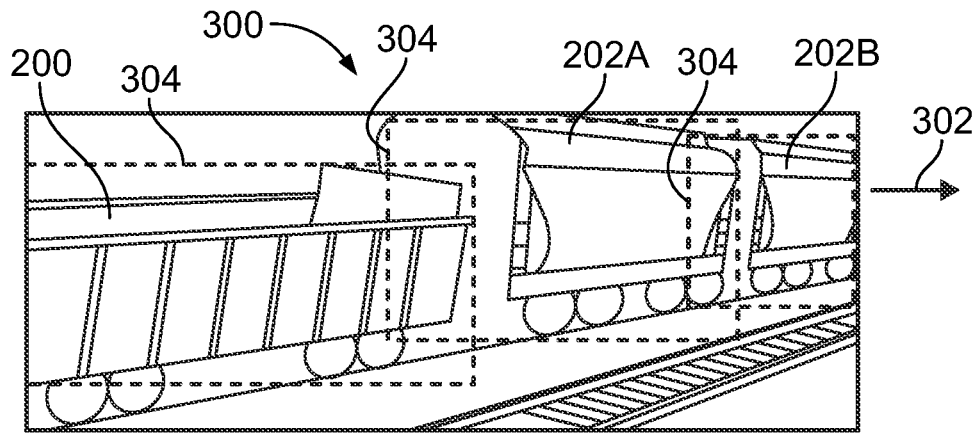
FIG. 3 shows a second image that depicts multiple train cars of the same train depicted in the image shown in FIG. 2.

The frame speed of the camera may be faster than the speed of the rail cars through the field of view of the camera, so each train car appears in multiple image frames generated by the camera. FIG. 3 shows a second image 300 that depicts multiple train cars 202 of the same train that is depicted in the image 200 shown in FIG. 2. The second image 300 may be generated subsequent to the image 200, and the train may be moving in a rightward direction 302. As a result, the hopper cars 202A, 202B are no longer the left-most and center cars in the image 300, but rather represent the center and right-most cars, respectively. The system can detect rail cars and other assets that only partially appear in a given frame of image data. In addition to detecting the assets in each image frame, it may be desirable to identify the consistency of each asset in the whole video stream. Therefore, the mobile asset system may utilize a multi-object tracking approach to track the asset movement between image frames.

In an embodiment, the field of view of the imaging device can capture a group of multiple assets moving in the scene and generate multiple images as the railcars move through the field of view. For example, the camera may generate 30 frames per second during a 10 second period of time, and each frame depicts at least a portion of three railcars. A first railcar may only be depicted in the frames generated during the first three seconds of the time period. The multi-object tracking approach of the identification algorithm can track the presence of each individual railcar through the 300 total image frames generated. For example, the identification algorithm can detect that the first railcar is present in the first 90 image frames (e.g., 30 frames per second multiplied by 3 seconds). The identification algorithm can likewise track each of the other railcars that travel through the field of view of the camera during the corresponding time period. The multi-object tracking can utilize uniquely-assigned alphanumeric identifiers and/or distinguishing appearance-based characteristics of the vehicles, such as specific features and/or indicia (e.g., damage, logo, graffiti, paint color, etc.) to track the same vehicle across multiple image frames. The multi-object tracking can be used to monitor the movement of the assets (e.g., for determining the speed of the assets), identify individual assets (e.g., for determining the order/sequence of assets), and/or count the number of assets. The assets association subroutine allows the system to know the sequence of the assets and identify the start and end frames for each asset in the image data for further analysis. As a result, the system is configured to consistently and accurately associate recognized identifiers with the corresponding individual assets. For example, colors of bounding boxes 304 surrounding the detected cars in FIG. 3 may match the colors of the bounding boxes 204 in FIG. 2 that surround the same detected cars.

Based on the ability to track objects across multiple image frames of image data generated by a single imaging device, the system can determine movement characteristics of the assets through the designated area. The movement characteristics can include a speed of the asset, a travel direction of the asset, and/or an orientation of the asset. The orientation can refer to whether the asset is facing towards the direction of movement or away from the direction of movement, otherwise referred to as traveling forward or in reverse. Such information about the movement of the asset can be included in the detection message to the asset control system. The direction of travel can be determined based on the relative position of the detected asset in the image frames over time. The speed of the asset can be determined based on a known reference distance or dimension (e.g., a known size of the asset, a known length of route in the field of view, or the like), the known frame rate of the imaging device, and the number of image frames in which the asset appears. The system may integrate depth image and/or 3D reconstruction to assist with determining the movement characteristics.

Key Frame Determination

The association subroutine may allow each asset to be distinguished and identified in a sequence of frames in the video stream. Some frames may partially capture the asset and/or or some frames may not have a good view of the assigned alphanumeric identifier on the asset due to distance of the asset from the camera, intervening objects that obscure the assigned identifier, poor quality of the assigned identifier (e.g., degraded or peeling paint), or the like. To perform the identification algorithm effectively and efficiently, the association subroutine may look to graphic identifiers to supplement the assigned identifiers. Furthermore, the subroutine may parse the images to select or designate a key frame for each asset that is depicted in the image data. The key frame is selected to provide a clear, large view of the identifier(s) on the asset, such as at a desirable size, position, scale, angle, or the like relative to the camera. The association subroutine then identifies the mobile asset with the assigned alphanumeric identifier where possible, and if not then looks to use the graphic identifiers in place thereof. In one embodiment, there is no assigned asset identifier and so only graphic identifiers are used.

The key frame may be selected based on the location and/or size of the bounding boxes associated with the same asset on different frames. In an embodiment, the key frame for a specific asset of interest may be selected by determining the image frame (in the sequence of multiple frames that depict the asset of interest) that has the largest, complete bounding box for the individual asset of interest. For example, a bounding box may only be generated if an entire side of the asset of interest is depicted in the corresponding image frame. Therefore, the key frame that is selected based on the size of the bounding box is ensured to show the entire side of the asset of interest. Referring to the images 200, 300 shown in FIGS. 2 and 3, the image 200 may be designated as the key frame for the car 202A because the bounding box 204 surrounding the car 202A is larger in the image 200 than the bounding box 304 surrounding the car 202A in the image 300. The larger bounding box indicates that the car is more proximate to the camera in the image 200 than in the image 300, so the graphic identifiers and assigned identifier on that car may be easier to detect and decipher by analyzing the image 200 instead of the image 300. By tracking the assets across multiple image frames, the association subroutine can designate a key frame for each of the assets. To increase processing speed and reduce computational effort and data storage, the identification algorithm may analyze only the key frames and may neglect and/or erase the image data of the other (e.g., non-key) frames. The designation of key frames and analysis of only the key frames may ensure that the number of image frames analyzed and the number of assigned identifiers detected matches the number of assets in the asset system that pass through the designated area monitored by the monitoring unit.

Detection of Identifier

The identifier detection subroutine of the identification algorithm is performed next to detect the identifiers on the assets depicted in the key frames. Because each of the key frames is associated with a different mobile asset of interest, and the mobile asset of interest in each key frame is surrounded by a corresponding bounding box, the key frame image data may be segmented to neglect and/or erase the image data of each key frame outside of the bounding box. In an embodiment, the identifier detection subroutine performs image analysis only on the image data within the bounding box of the asset of interest in the key frame. The image analysis is performed to detect one or more identifiers within the image data. As described above, the identifiers can include alphanumeric assigned identifiers that uniquely identify a single particular asset relative to all other assets and graphic identifiers that are distinguishing features that differentiate the particular asset from to at least some other assets. The identifiers may be displayed on a side of the mobile asset of interest.

The identifier, if an assigned identifier, may be an alphanumeric character string, such as an FRA ID that is painted, bonded, adhered, or otherwise displayed on an exterior of the asset. For example, the one or more processors may analyze the image data for characters, such as letters and numbers, which are located adjacent to one another. The image analysis may yield multiple candidate assigned identifiers because some assets may have multiple different markings that can be interpreted as letters, numbers, symbols, and/or the like. Typically, at least one of the candidate alphanumeric identifiers on a given side of the asset represents a uniquely-assigned identifier for the asset. That assigned identifier can be used by the asset control system for tracking the movement of the asset over time. It may be difficult for the system to detect assigned identifiers due to lighting and/or weather conditions, such as darkness, overcast weather, snow, rain, and the like. As a result, the monitoring system may be configured to adjust the properties of the imaging device and/or adjust the image analysis of the key frame based on the lighting and/or weather conditions. For example, the monitoring unit may change the wavelength at which the imaging device generates image data of the assets in the designated area. Furthermore, the monitoring unit may adjust settings of the image data prior to analysis, such as by enhancing the contrast, brightness, and/or the like.

The identifier, if a graphic identifier, may be a distinguishing indicia or feature on the exterior of the asset, such as a discoloration, damage (e.g., dent, rust, etc.), paint color, graffiti, decal or logo, an accessory or add-on, cargo, or other differentiating aspects. The graphic identifier may be used to substantiate the alphanumeric assigned identifier (just as the assigned identifier may be used for that purpose in reverse). Where the alphanumeric assigned identifier is not present, or is present but not visible, the system uses one or more graphic identifiers.

Prior to performing image analysis to detect the identifiers, the processors may determine one or more target areas of the key frame at which at least one of the identifiers is anticipated or expected to be present. With specific reference to the rail industry, some specific types of rail cars and/or business entities that own or operate the rail cars may display the assigned identifiers at specific areas on the rail cars. For example, a hopper car may display the assigned identifier of that hopper car at a lower left corner of an exterior side of the car, and a tanker car may display the assigned identifier of that tanker car at a top right corner of an exterior side of the car. The information linking types of assets and/or business entities with expected or anticipated locations of the assigned identifiers on the assets can be known and stored in memory, such as in a look-up table in a database, or in the hardware logic of a computing device.

In an embodiment, an artificial neural network is trained to determine or predict the types of assets depicted in the image data. The neural network may be stored in each monitoring unit. The neural network receives a given key frame of image data and predicts the type of asset in the frame. The type of asset itself is a graphic identifier of the asset and can be assigned to the detected asset in the image data. Then, based on the predicted type of asset and the predetermined association between the asset type and the identifier location, the one or more processors target one or more specific areas of the image frame that are believed to contain an assigned identifier. The one or more processors may also target one or more specific areas of the asset that are believed to contain a graphic identifier.

For example, in response to the neural network identifying a particular asset as a tanker car, the processors may access the look-up table to determine that the anticipated location of the assigned identifier is at the top right corner. Then, the processors may analyze the image data starting at the targeted top right corner in an attempt to detect the respective assigned identifier while limiting the total amount of image data that is analyzed. If the alphanumeric identifier is detected at the targeted area, then the processors decipher and catalog the identifier to positively identify the particular tanker car depicted in that image data and cease further analysis of that image frame. Targeting a specific area of the image data in which an identifier is anticipated can reduce the total amount of analysis performed relative to analyzing all of the image data within the asset bounding box. Optionally, the memory may store multiple anticipated locations of identifiers for a given asset type. If the assigned identifier is not detected in the first anticipated location, the processors may target the image data at a second anticipated location for analysis.

Optionally, instead of ceasing image analysis upon detecting the assigned identifier, the processors may analyze one or more other targeted areas of the image data to detect one or more graphic identifiers. For example, a look-up table may also include anticipated locations of graphic identifiers based on the type of asset, such as anticipated locations of rust, logos, cargo, paint schemes, dents, scratches, accessories, occupants, and the like. Any graphic identifiers that are detected can be cataloged with the detected alphanumeric identifier to establish an association between the assigned identifier and the graphic identifiers. Such associations can be utilized at a later time to positively identify the asset even if the assigned alphanumeric identifier is not visible and/or readable. For example, the detection message that is generated by a monitoring unit to the asset control system may include the deciphered assigned identifier for a given asset as well as one or more detected graphic identifiers (e.g., asset type, color, size, shape, load status, damage spots, dirt, and the like) that differentiate the given asset from at least some other assets. Although the example above describes detecting graphic identifiers after a successful detection of the assigned identifier for establishing associations between the graphic identifiers and the assigned identifier, the processors may also target the areas of the image data anticipated to contain graphic identifiers as a fallback method of identifying a given asset in response to an unsuccessful detection of the assigned alphanumeric identifier, as described herein.

An example of a graphic identifier that can be detected by targeting areas of image data is a business entity logo, trademark, or other indicia. For example, a first business entity may be known to display a company logo at a first known location on tanker cars operated by the first entity, and a second business entity displays a company logo at a different known location on tanker cars operated by the second entity. Whether or not the alphanumeric assigned identifier is successfully detected, the processors may analyze the image data at the first and second known locations. If a logo is detected at the first location in the image data, then the processors determine that the tanker car is operated by the first business entity and can assign that logo and/or business entity name as a graphic identifier associated with the depicted tanker car.

The processors may aggregate various information about each asset detected in the image data. The information can include the assigned identifier if successfully detected, the key frame image (especially if the assigned identifier is not detected), the timestamp at which the key frame image is generated, a note that the assigned identifier was not detected if that is the case, and any detected graphic identifiers. This information can be stored at least temporarily in the memory of the monitoring unit before being transmitted to the asset control system in a detection message. The graphic identifiers described above include the business entity corresponding to a detected logo and the type of asset, but the various other graphic identifiers that can be identified and assigned to the asset include paint color, size, shape, damage (scratches, dents, rust spots, etc.), cargo, accessories, occupancy, other markings, and the like. The graphic identifiers can be detected in part by targeting specific areas of the image data associated with anticipated locations of those features. A dent is more likely to appear on the lower areas, snow cover may appear on a roof, an occupant is more likely to appear in a cab of a vehicle, and so on.

In another embodiment, instead of identifying the type of asset, the artificial neural network may be trained to detect and identify other graphic identifiers on the asset depicted in the image data. For example, the neural network may be trained to detect logos, trademarks, and other markings on the assets that indicate the business entity that owns and/or operates the assets. Training a neural network to detect graphic identifiers, such as logos, dents, rust, and/or the like may be more accurate and/or efficient than performing other types of image analysis on the image data in the bounding box.

For detecting character strings in the image data that could represent the assigned identifier, the identifier detection subroutine may use object detection approaches. The detection subroutine may be able to generate an object bounding box to surround each candidate assigned identifier in the key frame. The parameters (x,y,w,h) of each object bounding box within a coordinate system can be known. Thus, the detection subroutine may provide a set of object bounding boxes that surround all candidate identifiers in the analyzes image data of the key frame. The geometrical information and other information, such as known typical locations based on asset type and/or business entity, can be used to distinguish the true assigned identifiers from other character strings on the cars (that do not uniquely identify the asset relative to all other assets).

Optionally, image rectification may be applied for some key frames to increase the likelihood of recognizing the content of the detected alphanumeric identifier. For example, if the alphanumeric assigned identifier in the image data appears a bit skewed, altering the identifier to appear square and/or horizontal may enhance the content recognition accuracy in the next step. The angle of the object bounding box may be measured, using the known coordinates of the object bounding box, to determine the skew or tilt. The image data within the object bounding box can be rectified based on the measured angle.

Identifier Content Recognition

The identifier content recognition subroutine of the identification algorithm may perform character content recognition for an assigned identifier, such as optical character recognition (OCR) on the image data. The image data depicting the assigned identifier may be defined by a bounding box, as described above. A multi-task deep artificial neural network may be used to decipher (e.g., recognize) the characters in the string. In an embodiment, the artificial neural network concurrently solve the problems of character localization and recognition.

Figure 4:
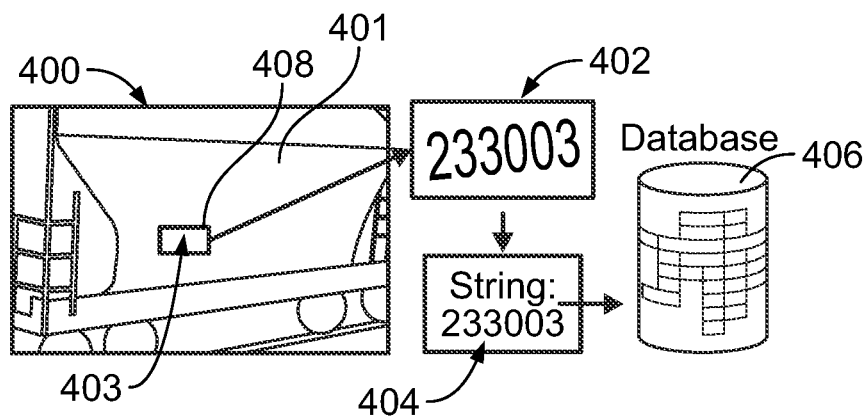
FIG. 4 is a diagram that illustrates an image showing a sub-portion of a key frame depicting a car of interest, an enlarged view of a detected assigned identifier on the car of interest, a data entry indicating a computer-deciphered content of the assigned identifier according to the identification algorithm, and a database.

FIG. 4 is a diagram that illustrates an image 400 showing a sub-portion of a key frame depicting an asset of interest 401, an enlarged view 402 of a detected assigned identifier 403 on the asset of interest, a data entry 404 indicating computer-deciphered content of the identifier according to the identification algorithm, and a database 406. With reference to the description above, once the assigned identifier is detected and bounded in a bounding box 408, the content recognition subroutine is performed to decipher the content of the identifier (e.g., to read the character string). In the illustrated embodiment, the content is determined to be "233003." The deciphered content is then stored in the database with other associated information, such as the time that the image is generated, the monitoring unit that generated the image data, and/or the location at which the image data was generated. The content number "233003" can be stored in a list within the database, which may represent the inventory database 156 shown in FIG. 1, a database within the memory 134 of the monitoring unit, or another database. Optionally, the database may include a look-up table that lists assigned identifiers, graphic identifiers, and other information about the corresponding assets. In an embodiment, the processors may compare the recognized assigned identifier (e.g., 233003) to the entries in the look-up table to access information about the specific asset associated with the identifier. For a train, the deciphered identifiers of multiple vehicles in the same train may be stored together in the database.

In an embodiment, the identifier content recognition subroutine may provide a confidence level or value with the deciphered content of the identifier. The confidence level or value may indicate a confidence level that the deciphered content of the identifier is accurate. For example, if the 233003 identifier is determined with a confidence of 95%, the identification algorithm indicates that there is an estimated 95% chance that 233003 represents the actual assigned identifier displayed on the rail car. In an embodiment, if the confidence level is at or greater than a designated threshold, such as 90%, 80%, 75%, or the like, then the deciphered content of the assigned identifier is stored in a database and/or compiled into a list of assigned identifiers. On the other hand, if the confidence level is lower than the designated threshold, then the processors are configured to mark that rail car as having an indecipherable or unrecognizable assigned identifier.

If the one or more processors are not able to recognize or decipher the content of an assigned identifier, then the processors may be configured to take one or more responsive actions. The content of an assigned identifier may be indecipherable due to poor image quality, poor display quality of the identifier on the car itself, obstruction of the identifier due to spray paint or an intervening object between the camera and the rail car, or the like. As indicated above, even if the content of an assigned identifier can be estimated, if the confidence level of the result is below a designated threshold (e.g., 80%, 75%, 70%, 65%, or the like) then the processors mark that rail car as having an indecipherable assigned identifier. The designated threshold may be selected by an operator that operates the asset identification and tracking system. In response to a rail car having an indecipherable assigned identifier, the processors may generate an alert that notifies an operator as to which car is indecipherable or "unidentified". The unidentified car may be described to the operator based on the number of the car in the sequence of the train. For example, the alert message may indicate that car "56" is unidentified. In response, a crew member may walk to that car to manually inspect the assigned identifier. In this way, manual inspection may be utilized only for the cars that are not able to be automatically identified by the processors above the confidence threshold.

The asset identification and tracking system has various automated processes for identifying assets with indecipherable assigned identifiers without requiring manual operator input or even any manual presence. For example, the matching of graphic identifiers can lead to a positive identification by narrowing the field of possible identities of an unknown asset.

The graphic identifiers are distinguishing characteristics that can help lead to a positive identification of the asset (e.g., relative to all other assets), especially when combined with information determined from other monitoring units that generate image data of the same asset. In an example in which a first monitoring unit determines that the type of an asset is a tanker car but cannot detect and/or decipher the assigned identifier, the first monitoring unit assigns the graphic identifiers to the unknown asset by communicating the graphic identifiers (and possibly also the image data) to the asset control system. A second monitoring unit at a later time may be able to successfully detect and decipher an assigned alphanumeric identifier on a tanker car leading to a positive identification of "Tanker A". The second monitoring unit also detects graphic identifiers of the Tanker A and communicates all such identifiers to the asset control system. The asset control system may be able to compare the graphic identifiers previously detected and logged by the first monitoring unit with the graphic identifiers of Tanker A detected and logged by the second monitoring unit to determine a level of match or correspondence. Depending on the degree of match and a confidence level associated with the matches (e.g., whether the matching feature are common or rare), the asset control system may be able to post hoc identify that the tanker detected by the first monitoring unit is Tanker A.

A particular mobile asset can be identified by a combination of multiple non-alphanumeric graphic identifiers that fit a determined combination threshold. The combination threshold can refer to the number of matching identifiers as well as the rarity of each match. For example, each match between a graphic identifier of a known asset and a graphic identifier of an unknown or unidentified asset can be assigned a score. The assigned scores may be higher for more unique matches. For example, a dent in an unusual location of an asset may be assigned a greater score than a type of asset and a logo on the asset. Hypothetically, the matching graphic identifiers from the first and second monitoring units may include an unusual dent, a type of asset, and a logo, and the matches may be assigned scores of 40, 25, and 15, respectively, for an aggregate score of 80. If the determined combination threshold is 70, then the aggregate match score of 80 surpasses the threshold, so the processors determine that the unidentified asset detected by the first monitoring unit is Tanker A. If the aggregate match score does not meet or exceed the threshold, then there is still no positive identification of the asset detected by the first monitoring unit.

As a result, the processors of the asset control system can update the information in the inventory database received from the first monitoring unit to indicate that the information refers to the Tanker A. For example, the asset control system may add the assigned identifier of Tanker A into the database entry that was lacking such information. Determining the identity of the asset earlier detected by the first monitoring unit provides more information of the movement of Tanker A over time. Tanker A was at the designated area monitored by the first monitoring unit and subsequently moved to the designated area monitored by the second monitoring unit. Such associations using graphic identifiers can enable positive identifications of assets even without deciphering unique assigned identification numbers, which reduces errors and improves the tracking of assets over time.

For assets that travel with other assets in an asset system, the asset identification and tracking system can utilized information from adjacent assets to identify an asset that has an indecipherable assigned identifier. For example, the one or more processors at a given monitoring unit may compile a list that includes all identifiers in order according to the order of the assets, such as the order of rail cars in a train. For example, the list can include all detected assigned identifiers and graphic identifiers associated with a first asset in a line, then all detected assigned identifiers and graphic identifiers associated with a second asset in the line, and so forth. Stated differently, the information communicated to the asset control system can indicate the order of the assets through the designated area monitored by the monitoring unit. For any unidentified assets in the line (having an undetected or indecipherable assigned identifier), the processors may be configured to make a note in the list at the designated place in the order (e.g., slot 56) that the asset is unidentified. In addition, the processors may be configured to store and/or communicate image data of the unidentified asset, without storing and/or communicating image data of at least some of the positively identified assets to limit the amount of data that is stored and/or communicated. For example, the list in the detection message can include the assigned identifiers that represent the identified assets and image data for the unidentified assets. The detection message can also include graphic identifiers for both identified and unidentified assets.

Information about the assets adjacent to an unidentified asset can represent graphic identifiers of the unidentified asset that can help identify the unidentified asset. For example, a first monitoring unit may detect that an unknown asset is the only asset between identified asset "123" and identified asset "XYZ," and such information is communicated to the asset control system. The detection message optionally may also include image data showing the adjacent assets in front and back of the unidentified asset are identifiable. If the asset control system subsequently receives a detection message from a second monitoring unit that indicates three positively identified assets "123," "ABC," and "XYZ" in that order, then the asset control system can deduce that the unknown asset from the first monitoring unit is asset "ABC". The asset control system can update the inventory database to reflect the positive identification. By making such an association, the asset control system now can track the asset "ABC" from the designated area monitored by the first monitoring unit to the designated area monitored by the second monitoring unit.

In an embodiment, the asset identification and tracking system is configured to decrease the confidence level of asset matching based on graphic identifiers over time. As time progresses, the confidence level of a positive identification may decrease based on relevancy periods of the particular graphic identifiers. For example, the relevancy period of a mud spot, snow, and a person's clothes may be a day if the mud is expected to be washed off after a shift, the snow is expected to melt, and the person is expected to change clothes daily. The relevancy period for a dent may be a few weeks if the dent is expected to be repaired after a few weeks. The probability or confidence in a given match may be based on the type of graphic identifier and the elapsed time from when the graphic identifier is assigned to the particular mobile asset to when an asset having a matching graphic identifier is detected. For example, if a first asset is detected as having a relatively unusual mud spot on a Monday morning, the system may assign a greater probability or confidence score to a matching mud spot on an asset detected on Monday afternoon then on an asset detected on Thursday because the mud may be washed off prior to Thursday. The confidence level can also adjust based on expected actions of the mobile asset. If a particular dump truck "x" is scheduled to dump a load at a given time and/or at a given dump location, then detecting a vehicle that lacks a full load prior to the scheduled dump time reduces the confidence that the detected vehicle is dump truck "x". Detecting a vehicle that lacks a full load after the scheduled dump time increases the confidence that the detected vehicle is dump truck "x". As the time advances in a given relevancy period, the confidence level decreases. For example, the confidence level regarding clothes on a person may reset on a day by day basis, but not hour by hour. The confidence level may decrease based on weather changes too, such that hats and coats may be added if the temperature drops during the day.

Because several graphic identifiers may be temporal in relevance as described above, the asset control system of the asset identification and tracking system can revise and update the list of graphic identifiers associated with known assets over time based on updated information. Referring to the example above, if the identified first asset has a mud spot, the mud spot can be stored as a graphic identifier assigned to that first asset. If the first asset is later positively identified by a monitoring unit and detected as lacking the mud spot, the lack of mud may be communicated in the detection message to the asset control system, which can delete or otherwise disassociate the mud spot graphic identifier from the first asset. Optionally, the asset control system may automatically delete graphic identifiers after the expiration of the designated relevancy period.

The asset identification and tracking system can detect persons in addition to vehicles and mobile equipment. The concepts described above can be applied in the detection and identification of people. For example, the artificial neural network may be trained to detect a person in the image data. The one or more processors may analyze the image data associated with the detected person for detecting identifiers. The person may have a unique assigned identifier that is worn by the person, such as an employee ID or a personal name on the person's shirt or jacket. If an assigned identifier of the person is not visible or decipherable, then the system can utilize graphic identifiers (e.g., differentiating features) to positively identify the person according to process of elimination. The graphic identifiers related to persons that can be detected in the image data can include a face, clothing, fashion accessory, outerwear, head gear, footwear, carrying bag, gait, or the like. Gait refers to the walking pattern as captured in multiple image frames over time. The gait can be categorized or described as a limp, jog, fast walk, slow walk, or the like. The speed of the person's movement can also be determined based on the movement of the person through the image frame over time and the known frame rate. The walking speed can represent a graphic identifier.

In an embodiment, the processors of a monitoring unit can analyze image data of a detected person to determine that the person has a colored jacket or logo associated with a particular business entity and that the person is not exhibiting a limp. The detection message can include these graphic identifiers. The asset control system can rule out various persons that do not work for the business entity and that do have a limp, thereby limiting the possible identities of the detected person. Based on the analysis, the system can detect unauthorized persons in the zone, such as a person that is not wearing a specific type or color of shirt or jacket. Upon detecting an unauthorized person, the system can generate an alert message for notifying personnel of a trespasser. The tracking of people may also be useful for safety purposes. For example, if there is an emergency in a rail yard, it may be useful to know the most recent locations of the crew members as detected by the tracking system and stored in a database.

The multiple sub-routines of the identification algorithm may be self-dependent, such that any component sub-routine may be independently operably and/or reusable with appropriate inputs. The mobile asset identification and tracking system may thus be able to automatically, and without human intervention, (i) identify the number of assets in an asset system (e.g., railcars in a train), (ii) designate a key frame associated with each asset based on how the asset appears in the camera view, (iii) crop one or more sub-portions of the image data to focus on a target area believed to depict an identifier (e.g., assigned or non-assigned), (iv) detect the identifier in the image data, and also (v) recognize the content of the identifier.

In an embodiment, the one or more processors of the mobile asset identification and tracking system may generate one or more control signals for controlling the mobile assets and/or equipment (e.g., track switches, signals, etc.) based on the information received in the detection message(s). The control signals may be signals that automatically control the mobile assets and/or equipment upon receipt of the control signals by the mobile assets and/or equipment, signals that prompt operators how to manually control the mobile assets, signals that control an electronic device to display information on the basis of which mobile assets are controlled, and/or the like. The electronic device that displays information may be a remote control device utilized to remotely control a mobile asset and/or a display device onboard a mobile asset. Based on information in received detection messages identifying the current location of various specific mobile assets, control signals may be generated for grouping and assembling assets into asset systems, such as trains, that will travel together along a route. For example, the control signals may autonomously control or prescribe movement of mobile assets from different current locations to a common route segment or parking area for staging in preparation for a trip. In another example, the one or more processors can compare the current location of a particular mobile asset, based on the information from the detection messages, to a desired location according to a schedule. If the particular mobile asset is not currently at the desired location, a control signal may be generated to cause the mobile asset to travel to the desired location.

The processor(s) of the asset identification and tracking system can also generate control signals to autonomously control track switches, signals, and/or other equipment to reduce the manual burden on operators and enable more efficient movement of mobile assets. For example, the processor(s) can sequentially actuate successive switches in the zone to enable a mobile asset to proceed along a prescribed path to a desired location without slowing or stopping, and the signaling can be timed to cause only minor interference, if any, on other mobile asset movements along different, intersecting paths.

Figure 5:
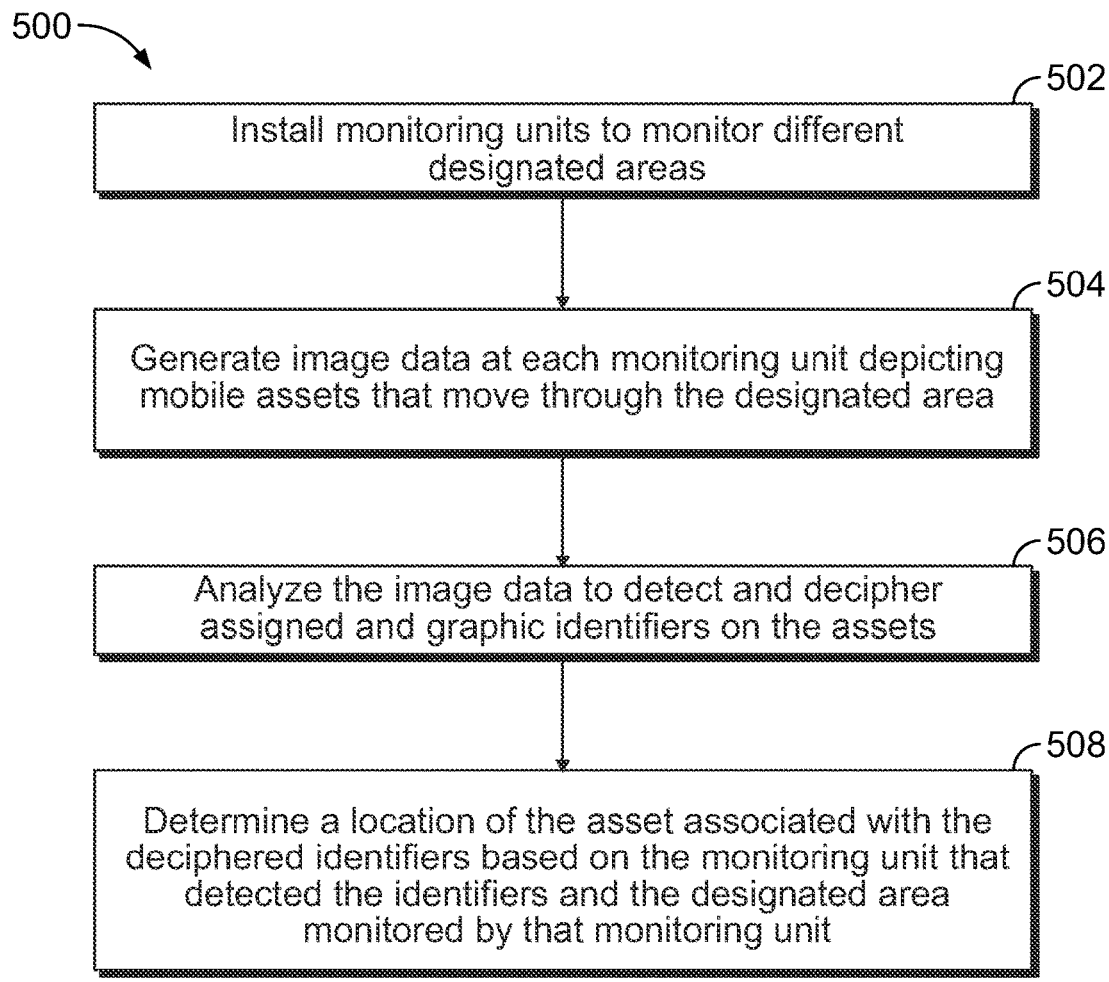
FIG. 5 is a flow chart of a method for identifying and tracking vehicles according to an embodiment.

FIG. 5 is a flow chart of a method 500 for identifying and tracking mobile assets, such as vehicles, according to an embodiment. The method may be performed by the monitoring units of the asset identification and tracking system 100 shown in FIG. 1. Optionally, the method may include additional steps, fewer steps, and/or different steps than the illustrated flow chart.

With additional reference to FIGS. 1 through 4, the method begins at 502, at which monitoring units are installed to monitor different designated areas of a zone or enclosure. At 504, image data is generated using a camera at each monitoring unit to monitor mobile assets that move through the designated areas. At 506, the image data that is generated by the camera at each monitoring unit is analyzed to detect and decipher identifiers on the assets. The identifiers can include assigned identifiers that are alphanumeric character strings. Optionally, the assigned identifiers may be FRA IDs. The identifiers also include graphic identifiers that are not assigned to uniquely identify the asset. The graphic identifiers may be non-alphanumeric (e.g., not limited to letters and numbers). For example, graphic identifiers can include differentiating features that are not present on at least some other mobile assets, such as custom paint, damage, discoloration, rust, graffiti, logos, dirt, snow, and the like. The identifiers are assigned to the particular mobile asset that is depicted in the image data. For example, the identifiers may be assigned to a particular mobile asset by establishing an association or connection between a successfully-deciphered assigned identifier of the asset, image data of the asset, and/or graphic identifiers of the asset that are detected in the image data. The association may be formed by generating a log entry in a memory and/or communicating that information in a detection message to an asset control system.

The graphic identifiers may be used to supplement the assigned identifiers for identifying the mobile asset. For example, if the alphanumeric assigned identifier is indecipherable, deciphered graphic identifiers can be used to identify the specific mobile asset relative to all other mobile assets. The deciphered identifier(s) are then compared to information in an inventory database to determine if the specific mobile asset associated with those identifier(s) is in the database. For example, if only graphic identifiers of a dent in the side of a given mobile asset and a logo indicating a brand is deciphered, image data or other information relating to the dent and the brand is compared to information in the database. If an entry in the database indicates that mobile asset #3144 has a brand and a dent that matches the graphic identifiers, then the particular mobile asset depicted in the image data can be identified (with at least some confidence depending on the pervasiveness of similar dents and of that brand) as mobile asset #3144.

At 508, a location of each mobile asset associated with deciphered identifiers is determined. The location for each mobile asset is determined based on the monitoring unit that detected and deciphered the identifier(s) associated with that mobile asset and the designated area monitored by that monitoring unit.

FIG. 6 illustrates a set 606 of images 608 poised for examination using an artificial neural network 602 that represents a portion of an identifier detection algorithm according to an embodiment. For example, the neural network may represent the neural network utilized to detect the mobile assets in the images and optionally to identify types of the mobile assets. Optionally, the neural network may represent the neural network utilized to decipher (e.g., recognize) the content of detected identifiers. The neural network may be stored within the memory 134 of each monitoring unit.

The neural network may be formed from one or more processors (e.g., microprocessors, integrated circuits, field programmable gate arrays, or the like). The neural network is divided into multiple layers 604, such as one or more input layers 604A that receive an input image, one or more output layers 604B that generate an output, and one or more intermediate layers between the input layer(s) and the output layer(s). The layers of the neural network represent different groups or sets of artificial neurons or nodes, which can represent different functions performed by the one or more processors on the input images to identify objects or features in the input images. The artificial neurons apply different weights in the functions applied to each input image to attempt to identify objects of interest in the input image.

The artificial neurons in the layers of the neural network can examine individual pixels of each image input into the neural network. The neural network may assign or associate different pixels with different object classes based on analysis of characteristics of the pixels. An object class is a type or category of an object appearing in the image. In general, a human body and an automobile can be two different object classes. More specific object classes for the mobile asset system described herein may include a hopper car as one object class, a tanker car as another object class, a background environment behind the rail cars as another object class, the number "2" as another object class, the number "3" as another object class, and the like.

Each pixel analyzed in the neural network can be labeled (e.g., associated) with a probability that the pixel represents various different object classes. For example, the artificial neuron (e.g., processors) can use linear classification to calculate classification scores for the different object classes or categories, and the classification scores indicate probabilities that a pixel represents each of various object classes. The classification score for a given pixel can be represented as a vector [a b c d], where the values of a, b, c, and d indicate the probability of the pixel representing each of different object classes. The classification score is referred to herein as a classification vector. Each artificial neuron can apply a mathematical function, such as an activation function, to the same pixel, with the functions applied by different neurons impacting the functions applied by other neurons. Different neurons may apply different weights to different terms in the functions than one or more, or all other neurons. Application of the functions generates the classification vectors for the pixels in the images, which can be used to identify different types of the vehicles, different characters in a string, or the like. The neural network may not be 100% accurate in predicting what objects are represented by different pixels, so the outputs are prediction-based.

The neurons in the layers of the neural network may determine the classification vectors for the various pixels in the images by examining characteristics of the pixels, such as the intensities, colors (e.g., wavelengths), and/or the like. The layers of artificial neurons in the neural network can examine each input images in sequential order, with the neurons of one intermediate (or hidden) layer examining a given pixel, followed by the neurons in an adjacent intermediate layer, and so on, to calculate the classification vectors of the given pixel. The results of functions applied to characteristics of a pixel by the neurons in preceding layers of the neural network influence the application of functions by the neurons in subsequent layers.

After the layers of the neural network have determined the classification vectors for the pixels, the neural network examines the classification vector of each pixel and determines the highest probability object class for each pixel. For example, a first pixel in the image having a classification vector of [0.6 0.15 0.05 0.2] indicates that the neural network calculates a 60% probability that the first pixel represents a first object class (e.g., a hopper car), a 15% probability that the first pixel represents a second object class (e.g., a tanker car), a 5% probability that the first pixel represents a third object class (e.g., background behind the train cars), and a 20% probability that the first pixel represents a fourth object class (e.g., a flatbed car). The neural network can determine that each pixel represents the object class having the greatest or largest probability in the corresponding classification vector for that pixel. For example, the neural network may determine that the first pixel described above represents a portion of a hopper car due to the 60% probability of being the hopper car object class. The selected probability may be used to convert the classification vector of the corresponding pixel to a one-hot vector. For example, the classification vector [0.6 0.15 0.05 0.2] described above would be converted to the one-hot vector [1 0 0 0], indicating that the pixel is determined to be part of a hopper car. The output is generated based on each pixel having the corresponding one-hot vector for the object class with the greater probability.

Weight values associated with each vector and neuron in the neural network constrain how the input images are related to outputs of the neurons. The weight values can be determined by the iterative flow of training data through the neural network. For example, weight values may be established during a training phase in which the neural network learns how to identify particular object classes by typical input data characteristics of the objects in training or ground truth images. For example, the neural network may be trained to detect characters, such as numbers and letters, and/or may be trained to detect vehicles, such as different types of rail cars. During the training phase, labeled training or ground truth images are input into the artificial neural network. A labeled training image is an image where all or a substantial portion of the pixels forming the image are associated with known object classes. In a labeled training image, a pixel labeled as [1 0 0 0] indicates that there is a 100% probability that the pixel represents at least a portion of an object in the first object class, and a zero percent probability that the pixel represents at least a portion of an object of any of second, third, or fourth object classes. Additional training of the neural network using labeled training images or ground truth images can improve the accuracy of the neural network at recognizing objects in images that are input into the neural network. The training modifies the weights and/or functions of the artificial neurons in the different layers, which may result in greater gaps in the probabilities for different object classes. For example, additional training may increase a probability that a pixel is within a first object class and decrease a probability that the pixel is within a second object class, increasing the confidence that the pixel is in the first object class as opposed to the second object class.

In an embodiment, an asset identification and tracking system is provided that includes one or more monitoring units and one or more processors. The one or more monitoring units are configured to monitor at least one designated area. Each of the monitoring units includes an imaging device configured to generate image data depicting one or more mobile assets that move through the at least one designated area. The one or more processors are operably coupled to the monitoring units and configured to analyze the image data to detect one or more non-alphanumeric graphic identifiers that are displayed on a particular mobile asset of the one or more mobile assets that move through the at least one designated area. The one or more processors further are configured to decipher or assign the one or more non-alphanumeric graphic identifiers to the particular mobile asset.

Optionally, the one or more processors further are configured to generate a detection message for communication to an asset control system. The detection message includes the one or more non-alphanumeric graphic identifiers. The system may also include the asset control system. The asset control system is configured to update an inventory database to associate the particular mobile asset with the one or more non-alphanumeric graphic identifiers. The detection message may also include information relating to a direction of travel or an orientation of the particular mobile asset. The detection message further includes information relating to an identity and/or a location of a particular monitoring unit of the one or more monitoring units that generates the image data of the particular mobile asset and a time at which the image data is generated.

Optionally, the one or more non-alphanumeric graphic identifiers include a face, clothing, fashion accessory, outerwear, head gear, footwear, carry bag, and/or gait. The one or more non-alphanumeric graphic identifiers can include a dent, scratch, graffiti, rust spot, logo, decal, paint scheme, and/or placard. The particular mobile asset may be identified by a combination of multiple non-alphanumeric graphic identifiers that fit a determined combination threshold.

Optionally, the one or more processors are configured to analyze the image data to detect an alphanumeric assigned identifier that is displayed on the particular mobile asset. The alphanumeric assigned identifier on the particular mobile asset is unique to the particular mobile asset. Optionally, the particular mobile asset is a rail vehicle.

Optionally, the one or more processors are disposed within the one or more monitoring units and are configured to detect the one or more non-alphanumeric graphic identifiers by inputting image frames of the image data one at a time as inputs in a forward propagation direction through layers of artificial neurons in an artificial neural network. The artificial neural network may be trained to determine a type of the particular mobile asset that moves through the designated area. The one or more processors may be configured to analyze the image data to detect the one or more non-alphanumeric graphic identifiers by accessing a look-up table that associates the type of the particular mobile asset with an anticipated location of the one or more non-alphanumeric graphic identifiers on the particular mobile asset.

Optionally, the particular mobile asset is a first mobile asset, and the image data generated by the one or more monitoring units depicts at least a second mobile asset. The one or more processors may be configured to analyze the image data to detect a second set of one or more non-alphanumeric graphic identifiers that are displayed on the second mobile asset. The one or more processors further may be configured to decipher or assign the second set to the second mobile asset.

In an embodiment, a method includes monitoring at least one designated area by generating image data depicting one or more mobile assets that move through the at least one designated area. The method includes analyzing the image data to detect one or more non-alphanumeric graphic identifiers that are displayed on a particular mobile asset of the one or more mobile assets that move through the at least one designated area. The method also includes assigning the one or more non-alphanumeric graphic identifiers to the particular mobile asset.

Optionally, the method also includes generating a detection message for communication to an asset control system. The detection message includes the one or more non-alphanumeric graphic identifiers assigned to the particular mobile asset. Optionally, the method also includes analyzing the image data to detect an alphanumeric assigned identifier that is displayed on the particular mobile asset. The alphanumeric assigned identifier on the particular mobile asset is unique to the particular mobile asset.

Optionally, monitoring the at least one designated area includes monitoring at least a first designated area and a second designated area. The one or more non-alphanumeric graphic identifiers are assigned to the particular mobile asset based on image data generated at the first designated area. The method also includes tracking the particular mobile asset from the first designated area to the second designated area based on detecting the one or more non-alphanumeric graphic identifiers assigned to the particular mobile asset in image data generated at the second designated area.

The method further may include determining a type of the particular mobile asset and/or a business entity that operates the particular mobile asset, and accessing a look-up table that associates the type of the particular mobile asset and/or the business entity with an anticipated location of the one or more non-alphanumeric graphic identifiers on the particular mobile asset. The one or more non-alphanumeric graphic identifiers are detected by analyzing the image data that depicts the anticipated location without analyzing the image data outside of the anticipated location. Optionally, the type of the particular mobile asset and/or the business entity that operates the particular mobile asset is determined by inputting image frames of the image data one at a time as inputs in a forward propagation direction through layers of artificial neurons in an artificial neural network.

In an embodiment, a system is provided that includes multiple monitoring units and an asset control system. The monitoring units are configured to monitor different designated areas. Each of the monitoring units includes and one or more processors. The imaging device is configured to generate image data depicting one or more mobile assets that move through the designated area. The one or more processors are configured to analyze the image data to detect one or more non-alphanumeric graphic identifiers that are displayed on a particular mobile asset of the one or more mobile assets that move through the designated area. The one or more processors further are configured to assign the one or more non-alphanumeric graphic identifiers to the particular mobile asset and generate a detection message for communication that includes the one or more non-alphanumeric graphic identifiers assigned to the particular mobile asset. The asset control system is configured to receive the detection message and update an inventory database to associate the particular mobile asset with both the one or more non-alphanumeric graphic identifiers and the designated area that is monitored by the monitoring unit that generated the detection message.

Optionally, the one or more processors are further configured to analyze the image data to detect one or more alphanumeric identifiers that are also displayed on the particular mobile asset, to assign the one or more alphanumeric identifiers to the particular mobile asset, and generate the detection message for communication that includes the one or more alphanumeric identifiers and the one or more non-alphanumeric graphic identifiers assigned to the particular mobile asset. The asset control system is configured to receive the detection message and update the inventory database to associate the particular mobile asset with the one or more non-alphanumeric graphic identifiers, the one or more alphanumeric identifiers, and the designated area that is monitored by the monitoring unit that generated the detection message.

In an embodiment, an asset identification and tracking system is provided that includes one or more monitoring units configured to monitor at least one designated area. Each of the monitoring units includes an imaging device and one or more processors. The imaging device is configured to generate image data depicting one or more mobile assets that move through the at least one designated area. The one or more processors are operably coupled to the imaging device and configured to analyze the image data to detect and decipher one or more identifiers that are displayed on a particular mobile asset of the one or more mobile assets that move through the at least one designated area. The one or more processors are further configured to generate a detection message that includes the one or more identifiers for communication to an asset control system.

Optionally, the one or more processors of each monitoring unit are configured to analyze the image data to detect and decipher identifiers that are displayed on multiple mobile assets that move through the at least one designated area. The detection message provides the identifiers in an ordered list that corresponds to an order in which the multiple mobile assets are depicted in the image data generated by the imaging device. In response to determining that one of the mobile assets depicted in the image data of one of the monitoring units is unidentified due to an inability to one or more of detect or decipher the one or more identifiers displayed thereon, the one or more processors may generate the detection message to indicate the location of the unidentified mobile asset relative to other mobile assets in the ordered list. The one or more processors may generate the detection message to include image data depicting the unidentified mobile asset, and the detection message may lack image data depicting at least some of the mobile assets that have detected and deciphered identifiers.

Optionally, the system further includes the asset control system, which is configured to determine a location of the particular mobile asset based on (i) receiving the detection message and (ii) determining the corresponding designated area that is monitored by the monitoring unit that generated the detection message. The asset control system may be configured to receive the detection message and update an inventory database to store a location of the particular mobile asset associated with the one or more identifiers based on the designated area of the monitoring unit that generates the detection message.

The one or more identifiers may include or represent character strings having letters and/or numbers. The one or more identifiers are displayed on exterior surfaces of the mobile assets. Optionally, the mobile assets are rail vehicles.

Optionally, the one or more processors of each monitoring unit are configured to detect the one or more identifiers by inputting image frames of the image data one at a time as inputs in a forward propagation direction through layers of artificial neurons in an artificial neural network. The artificial neural network may be trained to determine a type of each mobile asset that moves through the designated area of the monitoring unit. The one or more processors may be configured to analyze the image data to detect the one or more identifiers on the particular mobile asset by accessing a look-up table that associates the type of the particular mobile asset with an anticipated location of the one or more identifiers along the particular mobile asset.

The one or more processors may be configured to detect the mobile assets that move through the designated area of the monitoring unit and generate bounding boxes that surround the mobile assets that are detected. The one or more processors are configured to only analyze the image data within the bounding boxes to detect the identifiers. Optionally, the one or more processors are configured to track the particular mobile asset across a sequence of multiple image frames of the image data generated over time. The one or more processors configured to designate one of the image frames in the sequence as a key frame for the particular mobile asset. The one or more processors configured to detect and decipher the one or more identifiers on the particular mobile asset by analyzing the key frame without analyzing the other image frames in the sequence.

In an embodiment, a method is provided that includes monitoring at least one designated area by generating image data depicting one or more mobile assets that move through the at least one designated area. The method includes analyzing the image data to detect one or more identifiers that are displayed on a particular mobile asset of the one or more mobile assets that move through the at least one designated area. The method also includes generating a detection message that includes the one or more identifiers for communication to an asset control system. The one or more identifiers are assigned to the particular mobile asset in the detection message.

Optionally, the image data is analyzed to detect one or more identifiers that are displayed on each or multiple mobile assets that move through the at least one designated area, and the detection message provides the identifiers that are detected in an ordered list. The ordered list corresponds to an order in which the mobile assets are depicted in the image data generated at the corresponding monitoring unit that generates the detection message. The method may also include determining that one of the multiple mobile assets depicted in the image data of one of the monitoring units is unidentified. Generating the detection message may include indicating the location of the unidentified mobile asset relative to other mobile assets in the ordered list.

The method may include determining a location of the particular mobile asset based on determining the designated area that is monitored by the monitoring unit that generated the detection message. The method may also include updating an inventory database to store the location of the particular mobile asset based on the detection message.

Optionally, analyzing the image data includes inputting image frames of the image data one at a time as inputs in a forward propagation direction through layers of artificial neurons in an artificial neural network. The artificial neural network may be trained to determine a type of each mobile asset that is depicted in the image data. Analyzing the image data to detect the one or more identifiers displayed on the particular mobile asset may include accessing a look-up table that associates the type of the particular mobile asset with an anticipated location of the one or more identifiers along the mobile asset.

In an embodiment, an asset identification and tracking system is provided that includes a monitoring unit configured to monitor a designated area. The monitoring unit includes an imaging device and one or more processors operably coupled to the imaging device. The imaging device is configured to generate image data depicting mobile assets that move through the designated area. The one or more processors are configured to analyze the image data to detect identifiers that are displayed on the mobile assets that move through the designated area. The one or more processors are further configured to decipher the identifiers and generate a detection message for communication to an asset control system. The detection message provides the identifiers in an ordered list that corresponds to an order in which the mobile assets are depicted in the image data generated by the imaging device. The detection message further includes a time at which the image data is generated and one or more of an identification of the monitoring unit, a location of the monitoring unit, or an identification of the designated area monitored by the monitoring unit.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
an imaging device configured to generate image data depicting one or more mobile assets that move through a designated area; and
one or more processors configured to analyze the image data to detect one or more non-alphanumeric graphic identifiers of a particular mobile asset of the one or more mobile assets, each of the one or more non-alphanumeric graphic identifiers representing a feature that differentiates the particular mobile asset from at least some other mobile assets that move through the designated area without individually uniquely identifying the particular mobile asset, the one or more processors configured to compare the one or more non-alphanumeric graphic identifiers of the particular mobile asset that are detected to information in an inventory database associated with each of multiple identified assets to positively identify the particular mobile asset as a first identified asset of the multiple identified assets based on a level of match between the one or more non-alphanumeric graphic identifiers and the information in the inventory database associated with the first identified asset.

2. The system of claim 1, wherein the one or more processors further are configured to generate a detection message for communication to an asset control system, and the detection message includes the one or more non-alphanumeric graphic identifiers.

3. The system of claim 1, wherein the one or more processors are configured to update the inventory database, in response to positively identifying the particular mobile asset as the first identified asset, to reflect that the first identified asset was located in the designated area at a time that the image data was generated depicting the one or more non-alphanumeric graphic identifiers.

4. The system of claim 2, wherein the one or more processors are configured to generate the detection message to include information relating to at least one of a direction of travel of the particular mobile asset or an orientation of the particular mobile asset.

5. The system of claim 2, wherein the one or more processors are configured to detect and decipher an alphanumeric assigned identifier on the particular mobile asset by analyzing the image data, and the one or more processors generate the detection message to include both the alphanumeric assigned identifier and the one or more non-alphanumeric graphic identifiers associated with the particular mobile asset.

6. The system of claim 1, wherein at least one of the one or more non-alphanumeric graphic identifiers relates to an occupant of the particular mobile asset and includes one or more of a face, clothing, fashion accessory, outerwear, head gear, footwear, carry bag, or gait of the occupant.

7. The system of claim 1, wherein the one or more non-alphanumeric graphic identifiers comprise one or more of a dent, scratch, graffiti, rust spot, paint scheme, discoloration, cargo type, accessory type, or mud splatter.

8. The system of claim 1, wherein the one or more processors are configured to detect multiple non-alphanumeric graphic identifiers of the particular mobile asset by analyzing the image data, and are configured to positively identify the particular mobile asset as the first identified asset by a combination of the multiple non-alphanumeric graphic identifiers matching the information associated with the first identified asset to an extent that meets or exceeds a determined combination threshold.

9. The system of claim 1, wherein the particular mobile asset is a rail vehicle.

10. The system of claim 1, wherein the one or more processors are configured to analyze the image data to detect an alphanumeric assigned identifier that is displayed on the particular mobile asset, and the alphanumeric assigned identifier on the particular mobile asset is unique to the particular mobile asset.

11. The system of claim 1, wherein the one or more processors are configured to detect the one or more non-alphanumeric graphic identifiers by inputting image frames of the image data one at a time as inputs in a forward propagation direction through layers of artificial neurons in an artificial neural network.

12. The system of claim 11, wherein the artificial neural network is trained to determine a type of the particular mobile asset that moves through the designated area, and the one or more processors are configured to analyze the image data to detect the one or more non-alphanumeric graphic identifiers by accessing a look-up table that associates the type of the particular mobile asset with an anticipated location of the one or more non-alphanumeric graphic identifiers on the particular mobile asset.

13. The system of claim 1, wherein the one or more processors are configured to compare the one or more non-alphanumeric graphic identifiers of the particular mobile asset that are detected to the information in the inventory database in response an inability of the one or more processors to detect or decipher an alphanumeric identifier on the particular mobile asset in the image data, the alphanumeric identifier uniquely assigned to the particular mobile asset.

14. A method comprising:
generating image data depicting one or more mobile assets that move through a designated area;
analyzing the image data to detect one or more non-alphanumeric graphic identifiers of a particular mobile asset of the one or more mobile assets, each of the one or more non-alphanumeric graphic identifiers representing a feature that differentiates the particular mobile asset from at least some other mobile assets that move through the designated area without individually uniquely identifying the particular mobile asset;
comparing the one or more non-alphanumeric graphic identifiers atoll of the particular mobile asset that are detected to information in an inventory database associated with each of multiple identified assets; and
positively identifying the particular mobile asset as a first identified asset of the multiple identified assets based on a level of match between the one or more non-alphanumeric graphic identifiers and the information in the inventory database associated with the first identified asset.

15. The method of claim 14, further comprising generating a detection message for communication to an asset control system, the detection message including the one or more non-alphanumeric graphic identifiers.

16. The method of claim 14, further comprising analyzing the image data to detect an alphanumeric assigned identifier that is displayed on the particular mobile asset, and the alphanumeric assigned identifier on the particular mobile asset is unique to the particular mobile asset.

17. The method of claim 14, wherein the designated area is a first designated area and
the method comprises tracking the particular mobile asset from the first designated area to a second designated area based on analyzing second image data that depicts the second designated area and detecting the same one or more non-alphanumeric graphic identifiers in the second image data.

18. The method of claim 14, further comprising determining one or more of a type of the particular mobile asset or a business entity that operates the particular mobile asset, and accessing a look-up table that associates one or more of the type of the particular mobile asset or the business entity with an anticipated location of the one or more non-alphanumeric graphic identifiers on the particular mobile asset, the one or more non-alphanumeric graphic identifiers detected by analyzing the image data that depicts the anticipated location without analyzing the image data outside of the anticipated location.

19. The method of claim 18, wherein one or more of the type of the particular mobile asset or the business entity that operates the particular mobile asset is determined by inputting image frames of the image data one at a time as inputs in a forward propagation direction through layers of artificial neurons in an artificial neural network.

20. A system comprising:
multiple monitoring units associated with different designated areas, each of the monitoring units comprising:

an imaging device configured to generate image data depicting one or more mobile assets that move through the respective designated area of the different designated areas;

a communication device; and one or more processors configured to be operably coupled to the imaging device and the communication device and to analyze the image data generated by the imaging device to detect one or more non-alphanumeric graphic identifiers of a particular mobile asset of the one or more mobile assets, each of the one or more non-alphanumeric graphic identifiers representing a feature that differentiates the particular mobile asset from at least some of the other mobile assets that move through the respective designated area without individually uniquely identifying the particular mobile asset, the one or more processors configured to generate a detection message for communication by the communication device, the detection message including the one or more non-alphanumeric graphic identifiers and associating the one or more non-alphanumeric graphic identifiers with the particular mobile asset, and an asset control system including one or more processors and configured to receive the detection message and compare the one or more non-alphanumeric graphic identifiers to information in an inventory database associated with each of multiple identified assets to positively identify the particular mobile asset as a first identified asset of the multiple identified assets based on a level of match between the one or more non-alphanumeric graphic identifiers and the information in the inventory database associated with the first identified asset.

21. The system of claim 20, wherein the asset control system is configured to compare the one or more non-alphanumeric graphic identifiers of the particular mobile asset that are detected to the information in the inventory database in response to an inability of the one or more processors of the monitoring unit to detect or decipher an alphanumeric identifier on the particular mobile asset in the image data, the alphanumeric identifier uniquely assigned to the particular mobile asset.

* * * * *